(12) United States Patent
Li et al.

(10) Patent No.: US 11,646,771 B2
(45) Date of Patent: May 9, 2023

(54) FEEDBACK INFORMATION TRANSMISSION METHOD AND APPARATUS

(71) Applicant: HUAWEI TECHNOLOGIES CO., LTD., Guangdong (CN)

(72) Inventors: Shengyu Li, Beijing (CN); Lei Guan, Beijing (CN); Ruixiang Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 234 days.

(21) Appl. No.: 17/168,722

(22) Filed: Feb. 5, 2021

(65) Prior Publication Data
US 2021/0159948 A1    May 27, 2021

Related U.S. Application Data

(63) Continuation of application No. PCT/CN2019/099094, filed on Aug. 2, 2019.

(30) Foreign Application Priority Data

Aug. 7, 2018 (CN) .......................... 201810891742.6

(51) Int. Cl.
*H04B 7/0417* (2017.01)
*H04W 76/27* (2018.01)
(Continued)

(52) U.S. Cl.
CPC ......... *H04B 7/0417* (2013.01); *H04B 7/0456* (2013.01); *H04L 5/0055* (2013.01);
(Continued)

(58) Field of Classification Search
CPC ... H04B 7/0417; H04B 7/0456; H04L 5/0055; H04L 1/1614; H04L 1/1893;
(Continued)

(56) References Cited

U.S. PATENT DOCUMENTS

2017/0041123 A1*  2/2017  Yang .................. H04L 5/001
2017/0134140 A1    5/2017  Park
(Continued)

FOREIGN PATENT DOCUMENTS

CN    102025466 A    4/2011
CN    103580827 A    2/2014
(Continued)

OTHER PUBLICATIONS

Interdigital, Inc.,"Remaining issues on HARQ-ACK codebook",3GPP TSG RAN WG1 Meeting #92 Athens, Greece, Feb. 26 Mar. 2, 2018,R1-1802573,total 3pages.

(Continued)

*Primary Examiner* — Sharmin Chowdhury
(74) *Attorney, Agent, or Firm* — Womble Bond Dickinson (US) LLP

(57) ABSTRACT

This application provides a feedback information transmission method and an apparatus. The method includes a terminal device that receives indication information from a network device. The indication information indicates to generate a semi-static codebook. The terminal device detects a first physical downlink shared channel (PDSCH) at M candidate receiving positions in a first time unit. The first PDSCH is a semi-persistent scheduling (SPS) PDSCH or a grant-free PDSCH, and M is a positive integer. The terminal device determines, based on a detection result of the first PDSCH, whether to send first feedback information to the network device. The first feedback information includes acknowledgement (ACK) information or negative acknowledgement (NACK) information indicating whether the first PDSCH detected at the M candidate receiving positions is correctly decoded.

17 Claims, 14 Drawing Sheets

(51) Int. Cl.
*H04B 7/0456* (2017.01)
*H04L 5/00* (2006.01)
*H04W 72/1273* (2023.01)
*H04W 72/23* (2023.01)

(52) U.S. Cl.
CPC ....... *H04W 72/1273* (2013.01); *H04W 72/23* (2023.01); *H04W 76/27* (2018.02)

(58) Field of Classification Search
CPC ... H04L 1/0023; H04L 1/1854; H04L 1/1887; H04L 1/1896; H04L 5/0044; H04L 1/0078; H04W 72/1273; H04W 72/1289; H04W 76/27; H04W 72/0446; H04W 76/28
See application file for complete search history.

(56) References Cited

U.S. PATENT DOCUMENTS

| | | | | |
|---|---|---|---|---|
| 2019/0150181 A1* | 5/2019 | Kim | ...................... | H04L 1/1896 370/329 |
| 2019/0254053 A1* | 8/2019 | Ying | ..................... | H04L 5/0094 |
| 2020/0092900 A1* | 3/2020 | Dudda | .................. | H04W 80/02 |
| 2020/0204289 A1* | 6/2020 | Yoshimoto | ............ | H04L 1/0016 |
| 2021/0050948 A1* | 2/2021 | Gao | ...................... | H04W 72/23 |

FOREIGN PATENT DOCUMENTS

| | | |
|---|---|---|
| CN | 104253676 A | 12/2014 |
| CN | 106330272 A | 1/2017 |
| CN | 108365922 A | 8/2018 |
| EP | 2915263 A1 | 9/2015 |
| WO | 2011079774 A1 | 7/2011 |
| WO | 2014070602 A1 | 5/2014 |
| WO | 2014196616 A1 | 12/2014 |
| WO | 2017024532 A1 | 2/2017 |

OTHER PUBLICATIONS

MediaTek Inc.,"Remaining issues in carrier aggregation",3GPP TSG RAN WG1 Meeting #92 R1-1801649,Athens, Greece, Feb. 26 Mar. 2, 2018,Total 8 Pages.

CATT,"Remaining details of NR CA operation",3GPP TSG RAN WG1 Meeting #92 R1-1801740,Athens, Greece, Feb. 26 Mar. 2, 2018,Total 6 Pages.

* cited by examiner

FEEDBACK INFORMATION TRANSMISSION METHOD AND APPARATUS

CROSS-REFERENCE TO RELATED APPLICATIONS

This application is a continuation of International Application No. PCT/CN2019/099094, filed on Aug. 2, 2019, which claims priority to Chinese Patent Application No. 201810891742.6, filed on Aug. 7, 2018. The disclosures of the aforementioned applications are hereby incorporated by reference in their entireties.

TECHNICAL FIELD

This application relates to the communications field, and more specifically, to a feedback information transmission method and an apparatus in the communications field.

BACKGROUND

A fifth generation (5G) mobile communications system is committed to supporting higher system performance, and supporting a plurality of service types, different deployment scenarios, and a wider spectral range. The plurality of service types include enhanced mobile broadband (eMBB), massive machine type communication (mMTC), ultra-reliable low-latency communication (URLLC), a multimedia broadcast multicast service (MBMS), a positioning service, and the like. The different deployment scenarios include an indoor hotspot scenario, a dense urban scenario, a suburban scenario, an urban macro scenario, a high-speed railway scenario, and the like. The wider spectral range is a spectral range up to 100 gigahertz (GHz) that is supported in 5G, includes a low frequency part below 6 GHz, and also includes a high frequency part above 6 GHz and up to 100 GHz.

Currently, in downlink transmission of 5G new radio (NR), a semi-persistent scheduling (SPS) physical downlink shared channel (PDSCH) and a dynamically scheduled PDSCH are supported. For downlink data transmission, a hybrid automatic repeat request (HARD) is an efficient transmission mechanism. On the one hand, reliability of the downlink data transmission can be greatly improved through retransmission. On the other hand, user equipment (UE) feeds back HARQ acknowledgement (ACK)/negative acknowledgement (NACK) information, and a network device needs to perform retransmission only when the NACK information is fed back, thereby improving data transmission efficiency. In an NR design, configuration of two types of HARQ-ACK codebooks, namely, a dynamic codebook and a semi-static codebook, is supported. Currently, there is relatively large redundancy in generation of the semi-static codebook. Consequently, the semi-static codebook occupies a relatively large quantity of resources, causing a waste of resources and affecting communication efficiency.

SUMMARY

This application provides a feedback information transmission method and an apparatus, to reduce overheads that are of a semi-static codebook and that are in a generation process of the semi-static codebook, reduce a waste of resources, improve feedback reliability, and improve communication efficiency.

According to a first aspect, a feedback information transmission method is provided. The transmission method may be performed by a terminal device or a chip used in a terminal device. For example, the method is performed by the terminal device. The method includes: The terminal device receives indication information from a network device, where the indication information indicates to generate a semi-static codebook. The terminal device detects a first physical downlink shared channel PDSCH at M candidate receiving positions in a first time unit, where the first PDSCH is an SPS PDSCH or a grant-free PDSCH, and M is a positive integer. The terminal device determines, based on a detection result of the first PDSCH, whether to send first feedback information to the network device, where the first feedback information includes acknowledgement ACK information or negative acknowledgement NACK information indicating whether the first PDSCH detected at the M candidate receiving positions is correctly decoded.

According to the feedback information transmission method provided in the first aspect, the terminal device detects the first PDSCH at the M candidate receiving positions in the first time unit, and determines, based on the detection result, whether to send, to the network device, feedback information including the acknowledgement (ACK) information or the negative acknowledgement (NACK) information indicating whether the first PDSCH is correctly decoded. In other words, the terminal device determines, depending on whether the terminal device actually detects the first PDSCH in the first time unit, whether to generate and send the semi-static codebook that is in the first time unit. According to the transmission method, generation of the semi-static codebook can be more targeted, feedback reliability can be improved, resources used for generation and transmission of the semi-static codebook can be reduced, overheads of the semi-static codebook can be reduced, and communication efficiency can be improved.

In a possible embodiment of the first aspect, that the terminal device determines, based on a detection result of the first PDSCH, whether to send first feedback information to the network device includes: When detecting the first PDSCH at at least one of the M candidate receiving positions, the terminal device determines to send the first feedback information to the network device. The method further includes: The terminal device determines a second time unit based on a first time domain offset and the first time unit. The terminal device determines a fourth time unit set based on the second time unit and a time domain offset set, where the time domain offset set includes the first time domain offset. The terminal device detects a second PDSCH in time units included in the fourth time unit set, where the second PDSCH is scheduled by using a second PDCCH, and a feedback time unit of ACK or NACK information indicating whether the second PDSCH is correctly decoded is the second time unit. The terminal device determines, based on a detection result of the second PDSCH, second feedback information sent in the second time unit, where the second feedback information includes the ACK information or the NACK information indicating whether the first PDSCH is correctly decoded. The terminal device sends the second feedback information to the network device in the second time unit. In the embodiment, in a generation process of the semi-static codebook, time-frequency information of a time unit for performing feedback is determined based on a time domain offset K1 corresponding to the first PDSCH, rather than a time domain offset K1 set that is configured by using a higher layer or predefined. Optionally, the first feedback information (the ACK information or the NACK information of the first PDSCH) is fed back only in the second time unit that is determined based on the time domain offset K1 and that is used for performing feedback, and the NACK information or DTX information of the first PDSCH is not fed back in another time unit. According to the transmission method, redundancy of the semi-static codebook can be reduced, and transmission resources occupied by the semi-static codebook can be reduced. In the generation process of the semi-static codebook, the overheads of the semi-static codebook are reduced, a waste of resources is reduced, the feedback reliability is improved, and the communication efficiency is improved.

In a possible embodiment of the first aspect, when the second PDSCH is not detected in the time units included in the fourth time unit set, the second feedback information includes only the first feedback information. To be specific, the second feedback information includes only the ACK information or the NACK information indicating whether the first PDSCH is correctly decoded, and does not include ACK information or NACK information of any other PDSCH. Alternatively, the second feedback information does not include ACK information or NACK information corresponding to transmission of a PDSCH, other than the first PDSCH, in the fourth time unit set.

In a possible embodiment of the first aspect, when the terminal device detects only one second PDSCH in the time units included in the fourth time unit set, the second PDSCH is scheduled by using fallback downlink control information DCI on the second PDCCH, and a downlink assignment index DAI in the DCI is 1 or 0, the second feedback information includes only the first feedback information and third feedback information, and the third feedback information includes the ACK information or the NACK information indicating whether the detected second PDSCH is correctly decoded. To be specific, the second feedback information includes only the ACK information or the NACK information indicating whether the first PDSCH and the second PDSCH are correctly decoded, and does not include ACK information or NACK information of any other PDSCH.

In a possible embodiment of the first aspect, that the terminal device determines, based on a detection result of the first PDSCH, whether to send first feedback information to the network device includes: When detecting the first PDSCH at none of the M candidate receiving positions, the terminal device determines not to send the first feedback information to the network device. According to the transmission method, the resources can be saved, unnecessary feedback information is avoided, a waste of the transmission resources is avoided, resource utilization and the feedback reliability are improved, and the communication efficiency is improved.

In a possible embodiment of the first aspect, when the first PDSCH is the SPS PDSCH, the method further includes: The terminal device receives a first physical downlink control channel PDCCH from the network device, where the first PDCCH is used to activate transmission of SPS PDSCHs, the first time domain offset is indicated by the first PDCCH, and the first PDCCH further indicates position information of the first SPS PDSCH in the transmission of the SPS PDSCHs.

In a possible embodiment of the first aspect, the method further includes: The terminal device receives first configuration information from the network device, where the first configuration information includes a time domain interval between the SPS PDSCHs in the transmission of the SPS PDSCHs, and the first configuration information is carried in first radio resource control RRC signaling. The terminal device determines time domain information of the first time unit and time domain information of the M candidate receiving positions based on the first configuration information and the first PDCCH.

In a possible embodiment of the first aspect, when the first PDSCH is the grant-free PDSCH, the method further includes: The terminal device receives second configuration information from the network device, where the second configuration information includes the first time domain offset and position information of the grant-free PDSCH in transmission of grant-free PDSCHs, and the second configuration information is carried in second radio resource control RRC signaling. The terminal device determines time domain information of the first time unit and time domain information of the M candidate receiving positions based on the second configuration information.

According to a second aspect, a feedback information transmission method is provided. The transmission method may be performed by a network device or a chip used in a network device. For example, the method is performed by the network device. The method includes: The network device sends indication information to a terminal device, where the indication information indicates the terminal device to generate a semi-static codebook. The network device determines whether to send a first physical downlink shared channel PDSCH to the terminal device at M candidate sending positions in a first time unit, where the first PDSCH is an SPS PDSCH or a grant-free PDSCH, and M is a positive integer. The network device determines, depending on whether the network device sends the first PDSCH to the terminal device at the M candidate sending positions, whether to receive first feedback information from the terminal device, where the first feedback information includes acknowledgement ACK information or negative acknowledgement NACK information indicating whether the terminal device correctly decodes the first PDSCH detected at the M candidate sending positions.

According to the feedback information transmission method provided in the second aspect, the network device determines, depending on whether the network device sends the first physical downlink shared channel PDSCH to the terminal device at the M candidate sending positions in the first time unit, whether to receive the first feedback information from the terminal device, where the first PDSCH is the SPS PDSCH or the grant-free PDSCH. That is, the network device determines, depending on whether the first PDSCH is actually detected in the first time unit, whether to receive the semi-static codebook that is in the first time unit. According to the transmission method, the received static codebook can be more targeted, feedback reliability can be improved, resources used for generation and transmission of the semi-static codebook can be reduced, overheads of the semi-static codebook can be reduced, and communication efficiency can be improved.

In a possible embodiment of the second aspect, that the network device determines, depending on whether the network device sends the first PDSCH to the terminal device at the M candidate sending positions, whether to receive first feedback information from the terminal device includes: When sending the first PDSCH to the terminal device at at least one of the M candidate sending positions in the first time unit, the network device determines to receive the first feedback information from the terminal device. The method further includes: determining a second time unit based on a first time domain offset and the first time unit; determining a fourth time unit set based on the second time unit and a time domain offset set, where the time domain offset set includes the first time domain offset; determining whether a second PDSCH is sent to the terminal device in time units included in the fourth time unit set, where the second PDSCH is scheduled by using a second PDCCH, and a feedback time unit of ACK or NACK information indicating whether the terminal device correctly decodes the second PDSCH is the second time unit; and receiving second feedback information from the terminal device in the second time unit, where the second feedback information includes ACK information or NACK information indicating whether the first PDSCH is correctly decoded. In the embodiment, in a generation process of the semi-static codebook, time-frequency information of a time unit for performing feedback is determined based on a time domain offset K1 corresponding to the first PDSCH, rather than a time domain offset K1 set that is configured by using a higher layer or predefined. Optionally, the first feedback information (the ACK information or the NACK information of the first PDSCH) is received only in the second time unit that is determined based on the time domain offset K1 and that is used for performing feedback, and the NACK information or DTX information of the first PDSCH is not received in another time unit. According to the transmission method, redundancy of the semi-static codebook can be reduced, and transmission resources occupied by the semi-static codebook can be reduced. In the generation process of the semi-static codebook, the overheads of the semi-static codebook are reduced, a waste of resources is reduced, the feedback reliability is improved, and the communication efficiency is improved.

In a possible embodiment of the second aspect, when the network device does not send the second PDSCH to the terminal device in the time units included in the fourth time unit set, the second feedback information includes only the first feedback information.

In a possible embodiment of the second aspect, when the network device sends one second PDSCH to the terminal device in the time units included in the fourth time unit set, the second PDSCH is scheduled by using fallback downlink control information DCI on the second PDCCH, and a downlink assignment index DAI in the DCI is 1 or 0, the second feedback information includes only the first feedback information and third feedback information, and the third feedback information includes the ACK information or the NACK information indicating whether the terminal device correctly decodes the detected second PDSCH.

In a possible embodiment of the second aspect, that the network device determines, depending on whether the network device sends the first PDSCH to the terminal device at the M candidate sending positions, whether to receive first feedback information from the terminal device includes: When sending the first PDSCH to the terminal device at none of the M candidate sending positions in the first time unit, the network device determines not to receive the first feedback information from the terminal device. According to the transmission method, the resources can be saved, unnecessary feedback information is avoided, a waste of the transmission resources is avoided, resource utilization and the feedback reliability are improved, and the communication efficiency is improved.

In a possible embodiment of the second aspect, when the first PDSCH is the SPS PDSCH, the method further includes: The network device sends a first physical downlink control channel PDCCH to the terminal device, where the first PDCCH is used to activate transmission of SPS PDSCHs, the first time domain offset is indicated by the first PDCCH, and the first PDCCH further indicates position information of the first SPS PDSCH in the transmission of the SPS PDSCHs.

In a possible embodiment of the second aspect, the method further includes: The network device sends first configuration information to the terminal device, where the first configuration information includes a time domain interval between the SPS PDSCHs in the transmission of the SPS PDSCHs, and the first configuration information is carried in first radio resource control RRC signaling. The network device determines time domain information of the first time unit and time domain information of the M candidate sending positions based on the first configuration information and the first PDCCH.

In a possible embodiment of the second aspect, when the first PDSCH is the grant-free PDSCH, the method further includes: The network device sends second configuration information to the terminal device, where the second configuration information includes the first time domain offset and position information of the grant-free PDSCH in transmission of grant-free PDSCHs, and the second configuration information is carried in second radio resource control RRC signaling. The terminal device determines time domain information of the first time unit and time domain information of the M candidate sending positions based on the second configuration information.

According to a third aspect, a communications apparatus is provided. The apparatus includes units configured to perform the steps in any one of the first aspect or the possible embodiments of the first aspect.

According to a fourth aspect, a communications apparatus is provided. The apparatus includes units configured to perform the steps in any one of the second aspect or the possible embodiments of the second aspect.

According to a fifth aspect, a communications apparatus is provided. The apparatus includes at least one processor and a memory, and the at least one processor is configured to perform the method in any one of the first aspect or the possible embodiments of the first aspect.

According to a sixth aspect, a communications apparatus is provided. The apparatus includes at least one processor and a memory, and the at least one processor is configured to perform the method in any one of the second aspect or the possible embodiments of the second aspect.

According to a seventh aspect, a communications apparatus is provided. The apparatus includes at least one processor and an interface circuit, and the at least one processor is configured to perform the method in any one of the first aspect or the possible embodiments of the first aspect.

According to an eighth aspect, a communications apparatus is provided. The apparatus includes at least one processor and an interface circuit, and the at least one processor is configured to perform the method in any one of the second aspect or the possible embodiments of the second aspect.

According to a ninth aspect, a terminal device is provided. The terminal device includes the communications apparatus provided in the third aspect, or the terminal includes the communications apparatus provided in the fifth aspect, or the terminal includes the communications apparatus provided in the seventh aspect.

According to a tenth aspect, a network device is provided. The network device includes the communications apparatus provided in the fourth aspect, or the network device includes the communications apparatus provided in the sixth aspect, or the network device includes the communications apparatus provided in the eighth aspect.

According to an eleventh aspect, a computer program product is provided. The computer program product includes a computer program. When being executed by a processor, the computer program is used to perform the method in any one of the first aspect or the possible embodiments of the first aspect, or perform the method in any one of the second aspect or the possible embodiments of the second aspect.

According to a twelfth aspect, a computer-readable storage medium is provided. The computer-readable storage medium stores a computer program. When being executed, the computer program is used to perform the method in any one of the first aspect or the possible embodiments of the first aspect, or perform the method in any one of the second aspect or the possible embodiments of the second aspect.

DESCRIPTION OF EMBODIMENTS

The following describes technical solutions of this application with reference to the accompanying drawings.

The technical solutions in embodiments of this application may be applied to various communications systems, for example, a long term evolution (LTE) system, a 5th generation (5G) mobile communications system, or a future evolved mobile communications system. A mobile communications system used in the embodiments is not limited in this application.

Figure 1:
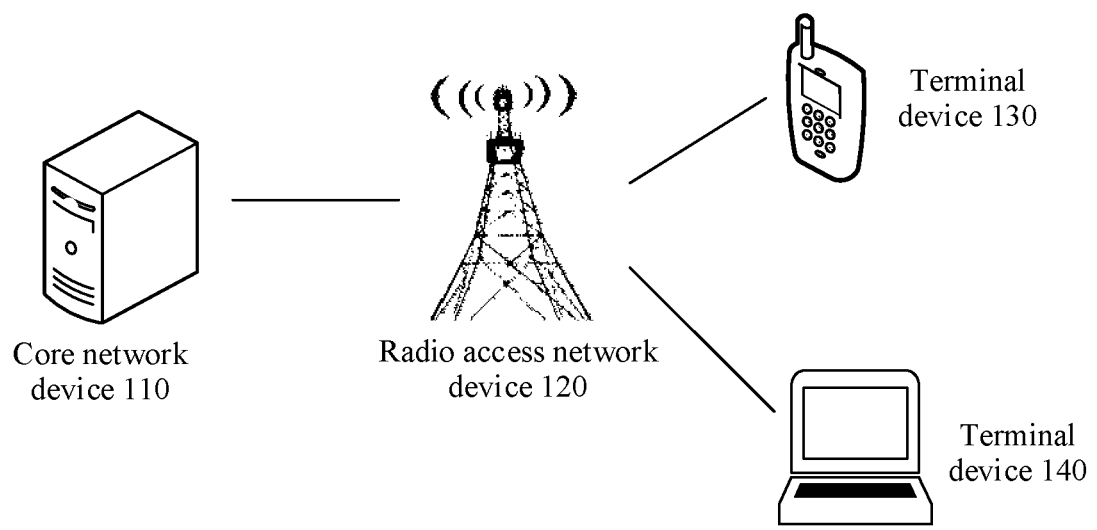
FIG. 1 is a schematic architectural diagram of a mobile communications system applicable to an embodiment of this application.

FIG. 1 is a schematic architectural diagram of a mobile communications system applicable to an embodiment of this application. As shown in FIG. 1, a mobile communications system 100 may include a core network device 110, a radio access network device 120, and at least one terminal device (for example, a terminal device 130 and a terminal device 140 shown in FIG. 1). A terminal device is connected to a radio access network device in a wireless manner, and the radio access network device is connected to a core network device in a wireless or wired manner. The core network device and the radio access network device may be independent physical devices that are different from each other, or functions of the core network device and logical functions of the radio access network device may be integrated into a same physical device, or a part of the functions of the core network device and a part of the functions of the radio access network device may be integrated into one physical device. The terminal device may be at a fixed position, or may be mobile. FIG. 1 is merely a schematic diagram. The communications system may further include another network device, for example, may further include a wireless relay device and a wireless backhaul device, which are not shown in FIG. 1. Quantities of core network devices, radio access network devices, and terminal devices included in the mobile communications system are not limited in this embodiment of this application.

The terminal device in the mobile communications system 100 may also be referred to as a terminal, user equipment (UE), a mobile station (MS), a mobile terminal (MT), or the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. In this application, the foregoing terminal device and a chip that can be used in the foregoing terminal device are collectively referred to as a terminal device. It should be understood that a specific technology and a specific device form that are used by the terminal device are not limited in this embodiment of this application.

In the mobile communications system 100, the radio access network device 120 is an access device through which the terminal device accesses the mobile communications system in a wireless manner. The radio access network device 120 may be a base station, an evolved NodeB (e.g., an eNB base station), a home base station, an access point (AP) in a Wi-Fi system, a wireless relay node, a wireless backhaul node, a transmission point (TP), a transmission reception point (TRP), or the like, or may be a gNB in an NR system, or may be a component that constitutes a base station or a part of devices that constitute a base station, for example, may be a centralized unit (CU), a distributed unit (DU), or a baseband unit (BBU). It should be understood that a specific technology and a specific device form that are used by the radio access network device are not limited in this embodiment of this application. In this application, the radio access network device is briefly referred to as a network device. Unless otherwise specified, in this application, all network devices are radio access network devices. In this application, the network device may be a network device, or may be a chip used in a network device to complete a wireless communication processing function.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory. The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a function module that is in the terminal device or the network device and that can invoke and execute the program.

For ease of understanding the embodiments of this application, the following first briefly describes several concepts that are in this application.

Time Unit and Time Domain Symbol:

A time domain resource used for wireless communication between a base station and a terminal device may be divided into a plurality of time units. In addition, in the embodiments of this application, the plurality of time units may be consecutive, or some adjacent time units may be spaced by preset intervals. This is not particularly limited in the embodiments of this application.

In the embodiments of this application, a length of one time unit is not limited. For example, one time unit may be one or more subframes. Alternatively, one time unit may be one or more slots. Alternatively, one time unit may be one or more symbols.

In the embodiments of this application, a symbol is also referred to as a time domain symbol, and may be an orthogonal frequency division multiplexing (OFDM) symbol, or may be a single-carrier frequency division multiple access (SC-FDMA) symbol. SC-FDMA is also referred to as orthogonal frequency division multiplexing with transform precoding (OFDM with TP).

In this embodiment of this application, there is a time sequence relationship between the plurality of time units in time domain, and time lengths corresponding to any two time units may be the same or may be different.

A 5G system is committed to supporting higher system performance, and supporting a plurality of service types, different deployment scenarios, and a wider spectral range. The plurality of service types include enhanced mobile broadband eMBB, mMTC, and URLLC. Compared with a 4G communications system, in the 5G system, a URLLC service is supported. There are a plurality of types of URLLC services. Typical examples include industrial control, industrial production process automation, man-machine interaction, telemedicine, and the like.

Currently, to support low-latency data transmission, 5G NR supports, in uplink transmission, configured grant physical uplink shared channel (PUCCH) transmission including a type 1 and a type 2. The type 1 is total grant-free (GF) transmission, and the type 2 is an evolution of SPS transmission in LTE. To support the low-latency transmission, periodicities of the type 1 and the type 2 may be both configured to be very short. Currently, a shortest periodicity of the type 1 and the type 2 may be configured as two OFDM symbols. However, in NR, a downlink transmission periodicity is not correspondingly decreased. Currently, in downlink transmission in NR, an SPS physical downlink shared channel (PDSCH) mainly for a voice over internet protocol (IP) (VoIP) service is supported, and a periodicity of the SPS PDSCH is at least 10 ms. In a follow-up release, downlink URLLC transmission may be supported by using an SPS PDSCH with a shorter periodicity. Reasons are mainly as follows: First, a data packet of the URLLC service is usually relatively small. If a physical downlink control channel (PDCCH) is used for scheduling in each transmission, extremely large control signaling overheads are caused, and resource utilization efficiency is reduced. Second, if the PDCCH is used for scheduling, high-reliability transmission of both the PDCCH and a PDSCH needs to be ensured, to ensure overall reliability of a downlink URLLC service. Consequently, an additional error risk is brought. Third, to ensure PDCCH reliability, a higher aggregation level needs to be used, and more resources are consumed. In this way, when a quantity of URLLC users increases, a base station sends PDCCHs to a plurality of users. Consequently, a PDCCH collision is caused, and a quantity of URLLC users who can be supported by a system is reduced.

In LTE, because of different available resources in uplink and downlink transmission in TDD, carrier aggregation, and the like, when feeding back ACK/NACK information in one time unit by using a physical uplink control channel (PUCCH), the terminal device needs to feed back, at a time, ACK/NACK information corresponding to PDSCHs in a plurality of time units or on a plurality of carriers. In NR, the network device may send a plurality of non-overlapping PDSCHs to the terminal device in one time unit. Consequently, complexity of feeding back ACK/NACK information on the PUCCH is increased. Therefore, the ACK/NACK information fed back by the terminal device on the PUCCH in one time unit may correspond to a plurality of time domain positions, or PDSCH occasions on a plurality of carriers.

In an NR design, configuration of two types of HARQ-ACK codebooks is supported. A HARQ-ACK codebook may be understood as an arrangement of ACK/NACK information that needs to be fed back in an uplink time unit and that corresponds to PDSCHs, and includes two meanings. First, the HARQ codebook includes the ACK/NACK information of the PDSCHs. Second, an arrangement order of the ACK/NACK information of the PDSCHs is shown in the codebook. The two types of HARQ-ACK codebooks include a dynamic codebook and a semi-static codebook.

The following briefly describes the dynamic codebook and the semi-static codebook.

The dynamic codebook is also referred to as a Type 2 HARQ codebook. The terminal device detects a PDCCH on each PDCCH monitoring occasion, and uses a time domain resource allocation field and a PDSCH-to-HARQ-timing field in the detected PDCCH. The terminal device first determines, based on a number of a slot in which the PDCCH is located, and a slot offset K0 that is between the PDCCH and a PDSCH and that is included in the Time Domain Resource Allocation field, a number of a slot in which the PDSCH is located, and then obtains HARQ-ACK timing, namely, a slot offset K1 between the PDSCH and a corresponding ACK/NACK feedback, based on the PDSCH-to-HARQ-timing field, to learn of information about a slot in which the ACK/NACK feedback is located. That is, the terminal device determines the slot in which the PDSCH scheduled by using a detected PDCCH format 1_0 or 1_1 is transmitted and the slot in which the corresponding ACK/NACK information is fed back. It is assumed that feedback is performed in a slot n. In addition, downlink control information (DCI) formats 1_0 and 1_1 on the PDCCH include downlink assignment index (DAI) information. The terminal device learns, based on the DAI information between PDCCHs that are detected twice and that need to be used to feed back ACK/NACK information in a same slot (e.g., slot n), PDCCHs that are not detected and that need to be used to feed back, in the slot n, ACK/NACK information scheduled by using the PDCCHs, so that a HARQ-ACK codebook of the slot n is generated.

The semi-static codebook is also referred to as a Type 1 HARQ codebook. The terminal device obtains a possible value K1 set of K1 based on a higher layer configuration, and then determines a slot offset K0 between a PDCCH and a PDSCH and a potential value set of time domain positions of the PDSCH based on a Time Domain Resource Allocation table configured by using a higher layer. Based on the foregoing information, the terminal device determines a maximum quantity of ACK/NACK information that need to be fed back in each slot. After a HARQ-ACK codebook in one slot is determined, the terminal device first determines a quantity of bits of ACK/NACK information, namely, a payload (payload size), that need to be fed back, and then selects one PUCCH resource set based on the payload size. Each PUCCH resource set includes at least 8 and at most 32 PUCCH resources. The terminal device further determines, based on a received ACK/NACK resource indicator (ARI) in the last PDCCH that is used to schedule the ACK/NACK information and that belongs to the codebook, which resource in a selected set is a PUCCH resource for feeding back the ACK/NACK codebook, and then feeds back the ACK/NACK codebook on the resource.

Currently, during generation of the semi-static codebook, in a protocol, transmission of a dynamic PDSCH and transmission of an SPS PDSCH are not distinguished, and the semi-static codebook is uniformly generated based on a K1 set, time domain resource allocation, and a downlink-uplink configuration (DL-UL Configuration) that are configured by using the higher layer or predefined. This is appropriate for the dynamic PDSCH. The dynamic PDSCH can be considered as a PDSCH scheduled by using a PDCCH. A time-frequency position of each PDSCH is not fixed, and an ACK/a NACK feedback occasion corresponding to each PDSCH may also be different. The terminal device may miss detecting a PDCCH. However, because the semi-static codebook is generated based on the K1 set, and the K1 set is a set including all possible time domain offsets between the PDSCH and corresponding ACK/NACK information of the PDSCH. Even if the terminal device misses detecting the PDCCH, the ACK/NACK information corresponding to a PDSCH scheduled by using the PDCCH belongs to the semi-static codebook. That is, the terminal device may feed back the NACK information corresponding to the PDSCH. However, for the SPS PDSCH, the SPS PDSCH is activated by an activation PDCCH, and one activation PDCCH is used to activate transmission of a plurality of SPS PDSCHs. Once the activation PDCCH is sent, sending positions of the plurality of SPS PDSCHs and positions of corresponding ACK/NACK feedbacks are subsequently determined. That is, time domain offsets K1 corresponding to the plurality of SPS PDSCHs are the same. If the semi-static codebook is still generated based on the K1 set, large redundancy is caused, and a waste of resources is caused. In addition, generation and feedback of the semi-static codebook need to be performed for both a PDSCH that is not detected and a PDSCH that is detected, causing a waste of resources.

Figure 2:
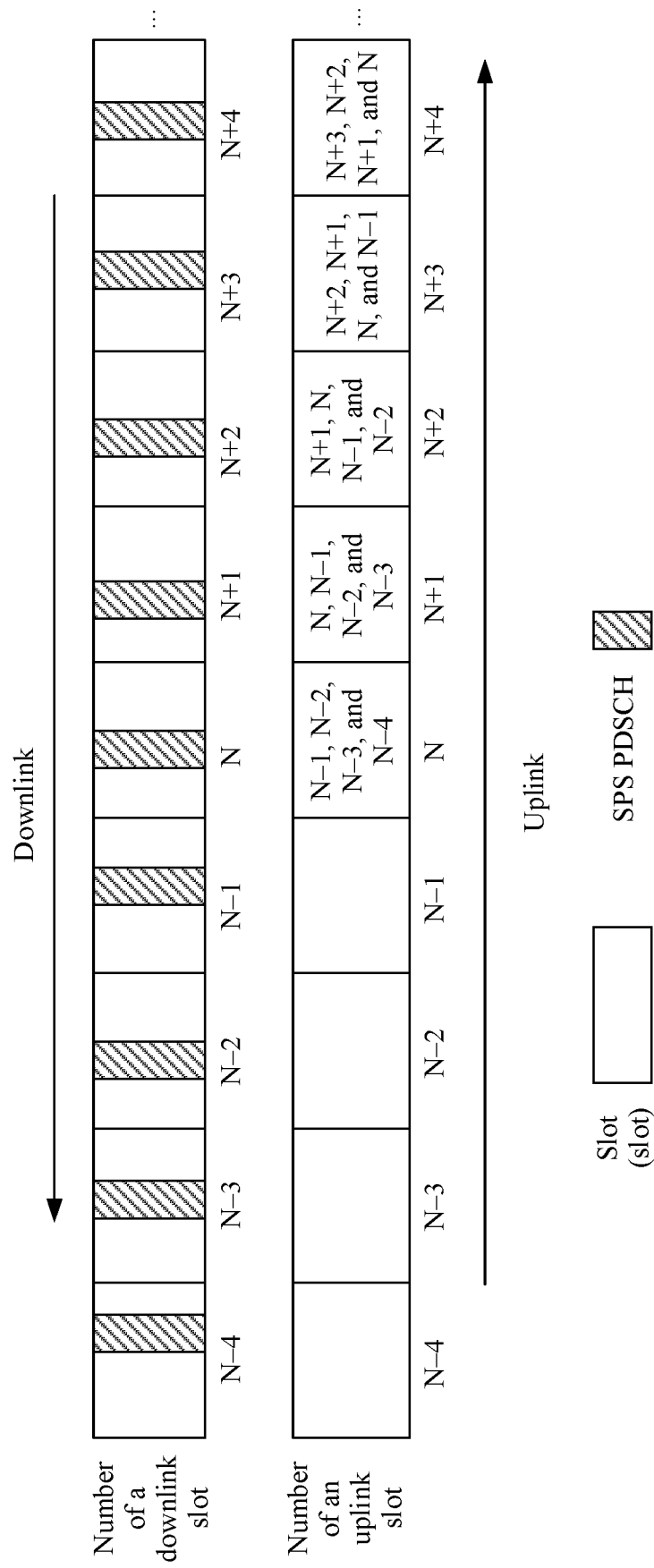
FIG. 2 is a schematic diagram of generating a semi-static codebook of an SPS PDSCH based on a K1 set in the conventional technology.

An example is used below for description. FIG. 2 is a schematic diagram of generating a semi-static codebook of an SPS PDSCH based on a K1 set in the conventional technology. As shown in FIG. 2, it is assumed that a periodicity of the SPS PDSCH is one slot, K1=1 is indicated in an activation PDCCH, and a K1 set configured by using a higher layer is {1, 2, 3, 4}. In this case, when the semi-static codebook is generated based on the K1 set, a size of a semi-static codebook in one uplink slot is 4 bits, and the semi-static codebook corresponds to feedbacks on the SPS PDSCH in the first four slots. However, based on an indication of K1 in the activation PDCCH, the size of the semi-static codebook in one uplink slot needs only one bit. In addition, for each SPS PDSCH, an ACK/a NACK feedback corresponding to the SPS PDSCH exists in four uplink slots. In other words, ACK/NACK information of a plurality of SPS PDSCHs is fed back in each uplink slot. For example, in the foregoing example, for an SPS PDSCH in a downlink slot numbered N, ACK/NACK information of the SPS PDSCH in the downlink slot numbered N exists in an uplink slot numbered N+1, and a NACK feedback of the SPS PDSCH in the downlink slot numbered N exists in an uplink slot numbered N+2, an uplink slot numbered N+3, and an uplink slot numbered N+4.

In addition, when the periodicity of the SPS PDSCH becomes very short, a base station side skips a sending occasion of an SPS PDSCH because no data arrives. However, even if the terminal device does not detect the SPS PDSCH, the terminal device feeds back discontinuous reception (DRX) or NACK information for the SPS PDSCH. This also causes a waste of transmission resources. Particularly, if the semi-static codebook is generated based on the K1 set, a plurality of slots determined based on the K1 set may include a plurality of SPS PDSCH sending occasions, and the terminal device may detect an SPS PDSCH on some occasions. For example, in the example shown in FIG. 2, it is determined, based on the K1 set, that possible sending occasions of an SPS PDSCH in N+4 uplink slots are the slots numbered N+3, N+2, N+1 and N. In the four slots, it is possible that the SPS PDSCH is not detected in some occasions, and the terminal device performs feedback on a sending occasion on which the SPS PDSCH is detected and sending occasions on which the SPS PDSCH is not detected. The semi-static codebook occupies a relatively large quantity of bits. Consequently, large redundancy is generated because of the semi-static codebook, and a waste of resources is caused.

Based on the foregoing problem, this application provides a feedback information transmission method and an apparatus, to reduce overheads of the semi-static codebook and reduce a waste of resources. This improves feedback reliability and communication efficiency.

Figure 3:
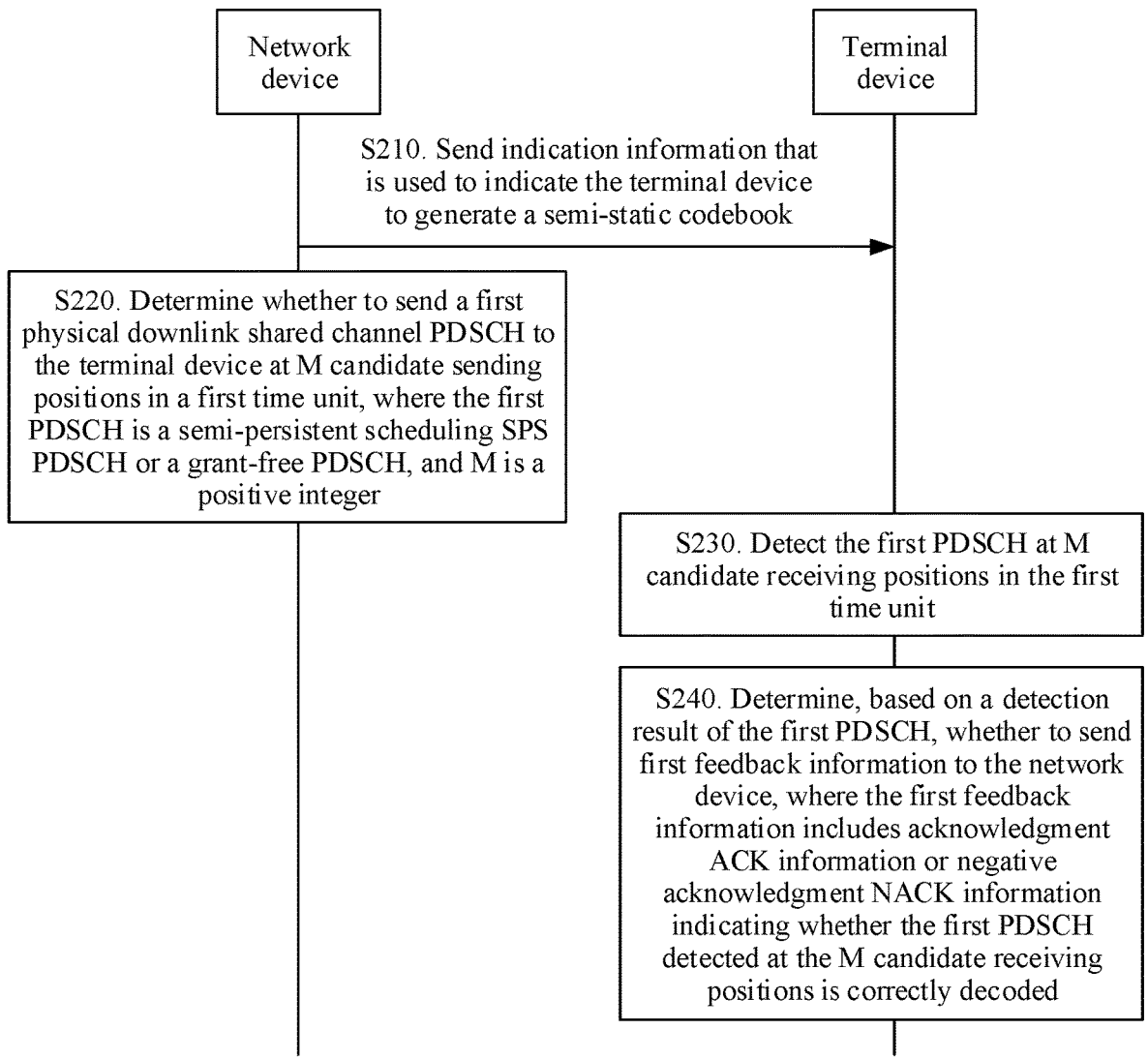
FIG. 3 is a schematic interaction diagram of a feedback information transmission method according to an embodiment of this application.

The following describes in detail the feedback information transmission method provided in this application with reference to FIG. 3. FIG. 3 is a schematic interaction diagram of a feedback information transmission method 200 according to an embodiment of this application. The method 200 may be applied to the scenario shown in FIG. 1, and certainly may also be applied to another communication scenario. This is not limited in this embodiment of this application.

It should be understood that in this embodiment of this application, the method 200 is described by using an example in which the method 200 is performed by a terminal device and a network device. By way of example, and not limitation, the method 200 may alternatively be performed by a chip used in the terminal device and a chip used in a network device.

As shown in FIG. 3, the method 200 includes the following steps.

S210. The network device sends indication information to the terminal device, where the indication information is used to indicate the terminal device to generate a semi-static codebook. Correspondingly, the terminal device receives the indication information from the network device.

S220. The network device determines whether to send a first physical downlink shared channel PDSCH to the terminal device at M candidate sending positions in a first time unit, where the first PDSCH is an SPS PDSCH or a grant-free PDSCH, and M is a positive integer.

S230. The terminal device detects the first PDSCH at M candidate receiving positions in the first time unit.

S240. The terminal device determines, based on a detection result of the first PDSCH, whether to send first feedback information to the network device, where the first feedback information includes acknowledgement ACK information or negative acknowledgement NACK information indicating whether the first PDSCH detected at the M candidate receiving positions is correctly decoded.

According to the feedback information transmission method provided in this application, the terminal device detects the first PDSCH at the M candidate receiving positions in the first time unit, and determines, based on the detection result, whether to send, to the network device, the feedback information including the ACK or NACK information indicating whether the first PDSCH is correctly decoded. In other words, the terminal device determines, depending on whether the terminal device actually detects the first PDSCH in the first time unit, whether to generate and send the semi-static codebook that is in the first time unit. Generation of the semi-static codebook can be more targeted, feedback reliability can be improved, resources used for generation and transmission of the semi-static codebook can be reduced, overheads of the semi-static codebook can be reduced, and communication efficiency can be improved.

Specifically, when the network device needs to send data to the terminal device, the network device needs to send the data to the terminal device on a PDSCH. The terminal device needs to determine, depending on whether the terminal device receives the data, whether to send feedback information to the network device. Before sending the data to the terminal device on a resource on which the first PDSCH is located, the network device needs to instruct the terminal device to configure the semi-static codebook, that is, generate the semi-static codebook. Therefore, in S210, the network device sends the indication information to the terminal device, to indicate the terminal device to generate the semi-static codebook. The indication information may be sent to the terminal device in a form of higher layer configuration information, or may be notified to the terminal device by using signaling in another form. A specific form or a sending manner of the indication information is not limited in this application.

In S220, the network device first determines, based on a predefined resource configuration, a time domain position of the first time unit and time domain positions of the M candidate sending positions in the first time unit. The M candidate sending positions are occasions on which the network device sends the data to the terminal device. In other words, the network device may send the data to the terminal device at the M candidate sending positions. The network device may send the first PDSCH to the terminal device at the M candidate sending positions in the first time unit. The first PDSCH is the SPS PDSCH or the grant-free PDSCH. The grant-free PDSCH may be understood as follows: Before the network device and the terminal device perform data transmission, the network device notifies the terminal device of information such as a time-frequency resource position of the PDSCH used for subsequent data transmission, and does not need to schedule initial PDSCH transmission by using physical layer control information, where the physical layer control information is, for example, DCI. The time-frequency resource position of the PDSCH may include a periodicity and a time-frequency position of the PDSCH, a time-frequency position of ACK or NACK feedback information corresponding to the data sent on the PDSCH, and the like. The network device does not need to send an activation PDCCH to activate transmission of the grant-free PDSCH. However, for the SPS PDSCH, the network device needs to send an activation PDCCH to activate transmission of the SPS PDSCH. After determining a time-frequency position of the first time unit and time-frequency positions of the M candidate sending positions in the first time unit, the network device may send or not send the data, that is, may determine whether to send the first PDSCH, to the terminal device at the M candidate sending positions in the first time unit. For example, when the network device needs to send the data to the terminal device in a time in which the first time unit is located, the network device may send the data to the terminal device at any one or more of the M candidate sending positions. Certainly, when the network device does not need to send the data to the terminal device in the time in which the first time unit is located, the network device may send the data to the terminal device at none of the M candidate sending positions.

In this embodiment of this application, a unit of the first time unit may be any one of a slot, a subframe, a transmission time interval (TTI), and a short transmission time interval (sTTI). A length of the first time unit may be one time unit. For example, the first time unit is one slot or one subframe. It should be understood that in this embodiment of this application, the unit of the first time unit may alternatively be another time unit. Alternatively, the length of the first time unit may be a length of a plurality of time units. This is not limited in this application.

In S230, the terminal device detects the first PDSCH at the M candidate receiving positions in the first time unit. Time-frequency positions of the M candidate receiving positions are the same as the time-frequency positions of the M candidate sending positions. That is, the M candidate receiving positions and the M candidate sending positions are at the same time-frequency positions. For example, it is assumed that the network device sends the data (the first PDSCH) to the terminal device on the third to the fifth symbols and the seventh to the ninth symbols in a slot 1. The first time unit herein is equivalent to the slot 1, and the M candidate sending positions are two candidate sending positions. Correspondingly, the terminal device detects, on the third to the fifth symbols and the seventh to the ninth symbols in the slot 1, the data sent by the network device. The M candidate receiving positions are two candidate receiving positions. The M candidate sending positions and the M candidate receiving positions are essentially same time-frequency resources.

It should be understood that the terminal device may determine, at each of the M candidate receiving positions in the first time unit through demodulation reference signal (DMRS) detection, energy detection, or the like, whether there is the data sent to the terminal device at the M candidate receiving positions. For example, the terminal device determines, through the DMRS detection, whether there is data on the first PDSCH or whether there is the data sent to the terminal device. Alternatively, the terminal device may detect the first PDSCH in another detection manner. A manner used by the terminal device to detect the first PDSCH is not limited in this application.

In S240, the terminal device detects the first PDSCH at the M candidate receiving positions in the first time unit.

The terminal device determines, based on the detection result of the first PDSCH, whether to send the first feedback information to the network device. The first feedback information includes the ACK information or the NACK information indicating whether the first PDSCH detected at the M candidate receiving positions is correctly decoded.

If the terminal device detects, at at least one of the M candidate receiving positions in the first time unit, that the network device sends the data to the terminal device, the terminal device decodes the detected data, to be specific, decodes the first PDSCH that is detected at the M candidate receiving positions, and feeds back ACK or NACK information indicating whether the decoding succeeds (i.e., is correct) to the network device, that is, determines that the first feedback information needs to be sent to the network device.

If the terminal device detects, at none of the M candidate receiving positions in the first time unit, that the network device sends the data to the terminal device, the terminal device does not send the first feedback information to the network device. That is, the terminal device performs feedback only for the detected first PDSCH. This can save resources, avoid unnecessary feedback information, and avoid a waste of transmission resources. This improves resource utilization, feedback reliability, and communication efficiency.

Figure 4:
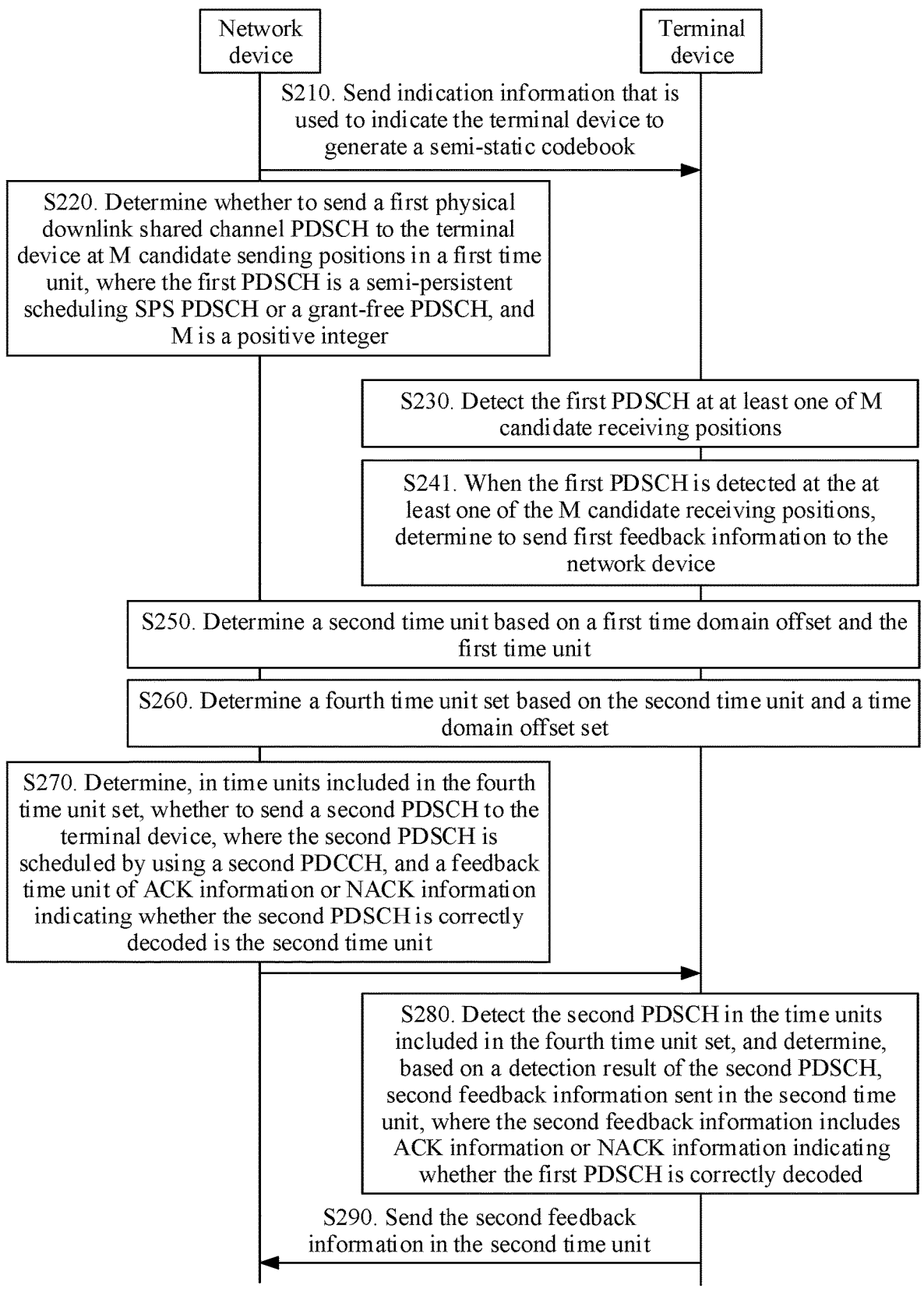
FIG. 4 is a schematic interaction diagram of another feedback information transmission method according to an embodiment of this application.

Optionally, in an embodiment, FIG. 4 is a schematic interaction diagram of the feedback information transmission method 200 according to another embodiment of this application. As shown in FIG. 4, in S240, that the terminal device determines, based on a detection result of the first PDSCH, whether to send first feedback information to the network device includes: S241. When the terminal device detects the first PDSCH at at least one of the M candidate receiving positions, the terminal device determines to send the first feedback information to the network device.

The method 200 further includes the following steps.

S250. The terminal device and the network device separately determine a second time unit based on a first time domain offset and the first time unit.

S260. The terminal device and the network device separately determine a fourth time unit set based on the second time unit and a time domain offset set, where the time domain offset set includes the first time domain offset, and the time domain offset set is a set of possible values of the first time domain offset.

S270. The network device determines, in time units included in the fourth time unit set, whether to send a second PDSCH to the terminal device, where the second PDSCH is scheduled by using a second PDCCH, and a feedback time unit of ACK or NACK information indicating whether the second PDSCH is correctly decoded is the second time unit.

S280. The terminal device detects the second PDSCH in the time units included in the fourth time unit set, and determines, based on a detection result of the second PDSCH, second feedback information sent in the second time unit, where the second feedback information includes the ACK information or the NACK information indicating whether the first PDSCH is correctly decoded.

S290. The terminal device sends the second feedback information to the network device in the second time unit.

Specifically, when the terminal device detects the first PDSCH at the at least one of the M candidate receiving positions in the first time unit, the terminal device feeds back, to the network device, the ACK information or the NACK information indicating whether the first PDSCH is correctly decoded. Therefore, information about a time domain position for sending the feedback information needs to be determined. In S250, the terminal device and the network device determine the second time unit based on the first time domain offset and the first time unit. The first time domain offset is equivalent to a value of K1, to be specific, a time domain offset K1 between the first PDSCH and a corresponding ACK/NACK feedback. The second time unit is a time unit in which the terminal device sends, to the network device, the ACK information or the NACK information indicating whether the first PDSCH is correctly decoded.

In this case, if another PDSCH is received in another time unit, and a feedback time unit corresponding to the PDSCH is also the second time unit, ACK or NACK information indicating whether the PDSCH detected in the another time unit is correctly decoded needs to be further fed back in the second time unit. Therefore, in S260, the terminal device and the network device determine the fourth time unit set based on the second time unit and the time domain offset set. The time domain offset set is the set of possible values of the first time domain offset, and may be configured by using a higher layer or predefined. The time domain offset set is equivalent to a K1 set. The time domain offset set includes the first time domain offset K1. In S270, the network device may send the second PDSCH to the terminal device in the time units included in the fourth time unit set. A time domain position of the second PDSCH does not overlap a time domain position of the first PDSCH. The second PDSCH is scheduled by using the second PDCCH, and the feedback time unit of the ACK information or the NACK information indicating whether the second PDSCH is correctly decoded is the second time unit. To be specific, if the network device sends the data to the terminal device in the time units included in the fourth time unit set, the network device sends the second PDSCH to the terminal device in the time units included in the fourth time unit set. If the network device does not send the data to the terminal device in the time units included in the fourth time unit set, the network device does not send the second PDSCH to the terminal device in the time units included in the fourth time unit set. Correspondingly, the terminal device detects the second PDSCH in the time units included in the fourth time unit set.

It should be understood that when the terminal device detects the second PDSCH in the time units included in the fourth time unit set, the terminal device first needs to detect the second PDCCH for scheduling the second PDSCH. The second PDCCH is used to schedule transmission of the second PDSCH. In addition, the ACK information or the NACK information that corresponds to the second PDSCH and that is indicated by a PDSCH-to-HARQ-timing field in the second PDCCH is sent in the second time unit. To be specific, the PDCCH also indicates a time domain offset K1 of the second PDSCH, and it may be determined, based on K1, that the ACK/NACK information corresponding to the second PDSCH is fed back in the second time unit. That is, the terminal device first needs to detect the second PDCCH, and starts to decode the second PDSCH only after detecting the second PDCCH. The second PDSCH may be a dynamic PDSCH. A method for detecting the second PDCCH by the terminal device is similar to the foregoing method for detecting the first PDSCH.

In S280, the terminal device determines, based on the detection result of the second PDSCH, the second feedback information sent in the second time unit. The second feedback information includes at least the first feedback information. To be specific, the terminal device determines whether the ACK information or the NACK information fed back in the second time unit further includes ACK or NACK information of another PDSCH (e.g., the second PDSCH) in addition to the ACK information or the NACK information of the first PDSCH.

In S290, the terminal device sends the second feedback information to the network device in the second time unit.

Optionally, the terminal device does not send the first feedback information to the network device in a third time unit. The third time unit is different from the second time unit. In other words, the third time unit and the second time unit are not a same time unit. Optionally, the third time unit may be a time unit, other than the second time unit, in a fifth time unit set determined based on the first time unit and the time domain offset set K1 set. Certainly, the third time unit may alternatively be determined in another manner. It should be understood that, that the first feedback information is not sent to the network device in the third time unit means that neither the first feedback information nor the NACK information or discontinuous transmission (DTX) information corresponding to the first PDSCH is sent in the third time unit. That is, no feedback information corresponding to the first PDSCH is sent in the third time unit.

Figure 5:
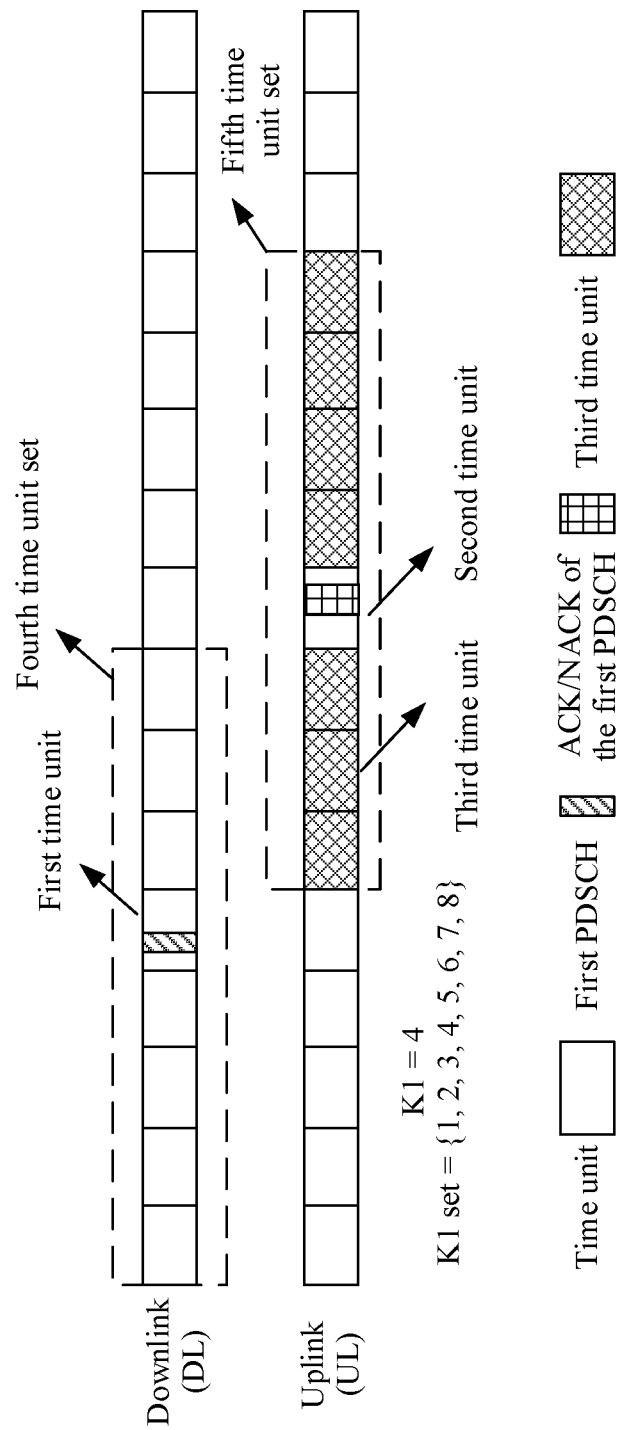
FIG. 5 is a schematic diagram of transmission unit division according to an embodiment of this application.

The following provides description with reference to an example shown in FIG. 5.

FIG. 5 is a schematic diagram of time unit division according to an embodiment of this application. As shown in FIG. 5, the first time domain offset K1 is equal to 4, and the time domain offset set K1 set={1, 2, 3, 4, 5, 6, 7, 8}. Time domain offsets included in the time domain offset set are all the possible values of the first time domain offset K1. A position of the second time unit in which the second feedback information needs to be sent may be determined based on the first time unit and the first time domain offset K1. In addition, the fourth time unit set may be determined based on the second time unit and the time domain offset set. As shown in FIG. 5, the fourth time unit set includes eight time units, and the first time unit is one of the eight time units. The terminal device may detect the second PDSCH in the time units included in the fourth time unit set, and the time domain position of the second PDSCH does not overlap the time domain position of the first PDSCH. In addition, the ACK information or the NACK information corresponding to the second PDSCH is also fed back in the second time unit. The terminal device determines, based on the detection result of the second PDSCH, the second feedback information sent in the second time unit. The second feedback information includes at least the ACK information or the NACK information indicating whether the first PDSCH is correctly decoded. That is, the second feedback information includes at least the first feedback information.

Optionally, the terminal device does not send the first feedback information to the network device in the third time unit. The third time unit is different from the second time unit. The third time unit and the second time unit are not the same time unit. The third time unit is a time unit, other than the second time unit, in the fifth time unit set determined based on the first time unit and the time domain offset set K1 set. For example, the third time unit is the third time unit shown in FIG. 5. It should be understood that, that the first feedback information is not sent to the network device in the third time unit means that neither the first feedback information nor the NACK information or the DTX information corresponding to the first PDSCH is sent in the third time unit. That is, no feedback information corresponding to the first PDSCH is sent in the third time unit.

It should be understood that FIG. 5 is merely an example, and should not constitute any limitation on this embodiment of this application. For example, in this embodiment of this application, the first time domain offset K1 may alternatively be another value. The time domain offset set K1 set may further include more values. This is not limited in this application.

According to the feedback information transmission method provided in this application, in a generation process of the semi-static codebook, time-frequency information of a time unit for performing feedback is determined based on the time domain offset K1 corresponding to the first PDSCH, rather than the time domain offset K1 set. In addition, the first feedback information, such as the ACK information or the NACK information of the first PDSCH, is fed back only in the time unit that is determined based on the time domain offset and that is used for performing feedback, and the NACK information or the DTX information of the first PDSCH is not fed back in another time unit. Redundancy of the semi-static codebook can be reduced, and transmission resources occupied by the semi-static codebook can be reduced. In the generation process of the semi-static codebook, the overheads of the semi-static codebook are reduced, a waste of resources is reduced, the feedback reliability is improved, and the communication efficiency is improved.

In an embodiment, in S280, when the terminal device does not detect the second PDSCH in the time units included in the fourth time unit set, the second feedback information includes only the first feedback information.

Specifically, the terminal device detects the second PDSCH in the time units included in the fourth time unit set. When the terminal device detects the second PDSCH in none of the time units included in the fourth time unit set, the network device does not send the second PDSCH to the terminal device. For example, as shown in FIG. 5, the terminal device detects the second PDSCH in the time units included in the fourth time unit set. If the terminal device detects the second PDSCH in none of the time units included in the fourth time unit set, the terminal device only needs to feed back the first feedback information in the second time unit. To be specific, the terminal device feeds back, in the second time unit, only the ACK information or the NACK information indicating whether the first PDSCH is correctly decoded, and does not feed back ACK/NACK information of any other PDSCH in the second time unit. For example, ACK information or NACK information corresponding to a potential dynamic PDSCH or another SPS PDSCH in the fourth time unit set does not need to be fed back. In this case, the second feedback information sent in the second time unit is the first feedback information. In other words, only the ACK information or the NACK information indicating whether the first PDSCH is correctly decoded needs to be fed back in the second time unit. Optionally, the terminal device does not feed back, in another time unit (e.g., the third time unit), the NACK information or the DTX information corresponding to the first PDSCH.

In an embodiment, in S280, the terminal device detects only one second PDSCH in all time units included in the fourth time unit set. The second PDSCH is scheduled by using fallback downlink control information DCI on the second PDCCH. When a downlink assignment index (DAI) in the DCI is 1 or 0, the second feedback information sent in the second time unit includes only the first feedback information and third feedback information. The third feedback information includes the ACK information or the NACK information indicating whether the detected second PDSCH is correctly decoded.

Figure 6:
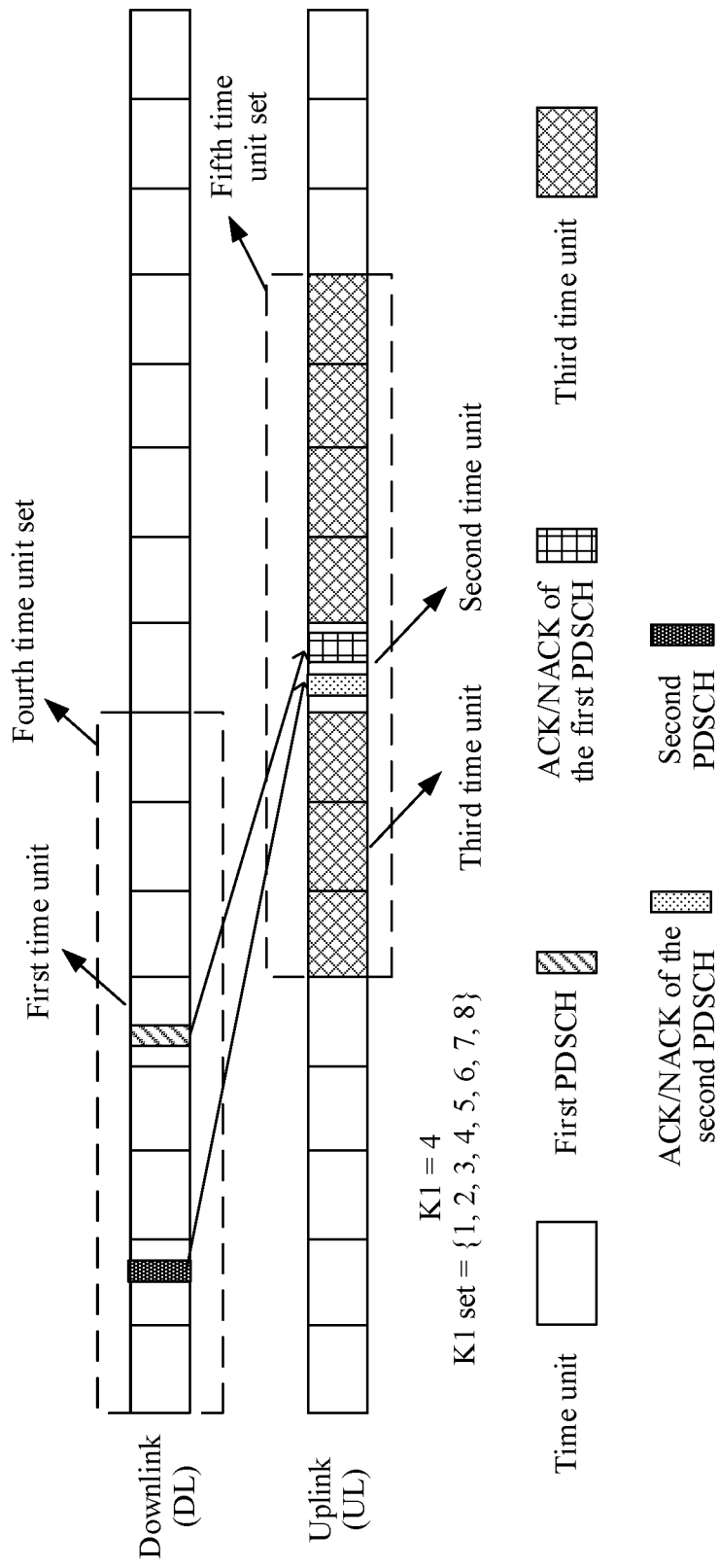
FIG. 6 is a schematic diagram of still another transmission unit division according to an embodiment of this application.

Specifically, an example shown in FIG. 6 is used for description. FIG. 6 is a schematic diagram of time unit division according to an embodiment of this application. As shown in FIG. 6, the terminal device detects the second PDSCH in the time units included in the fourth time unit set. In a case, only one second PDSCH is detected in the time units included in the fourth time unit set, the detected second PDSCH is scheduled by using the fallback DCI on the second PDCCH, and the DAI in the fallback DCI is 1. To be specific, the network device schedules one second PDSCH by sending a special DCI format (such as the fallback DCI, where whether each bit field in the fallback DCI exists and a quantity of occupied bits are predefined, and no higher layer parameter configuration is required, which is the same as a DCI format 0_0 or 1_0 in a 5G NR technology). In addition, DAI information included in the fallback DCI indicates that the DAI is 0 or 1. The ACK information or the NACK information indicating whether the second PDSCH is correctly decoded also needs to be fed back in the second time unit. The second PDSCH may be sent to the terminal device in any time unit, other than the first time unit, in the fourth time unit set, or may be sent at a time domain position that is in the first time unit and that does not overlap the M candidate receiving positions of the first PDSCH. In this case, the second feedback information sent to the network device in the second time unit includes only the first feedback information and the third feedback information, and the third feedback information is the ACK information or the NACK information indicating whether the detected second PDSCH is correctly decoded. To be specific, the terminal device feeds back, in the second time unit, only the ACK information or the NACK information indicating whether the first PDSCH is correctly decoded, and the ACK information or the NACK information indicating whether the second PDSCH is correctly decoded, and does not feed back ACK/NACK information of any other PDSCH in the second time unit. In other words, ACK information or NACK information of any other downlink data transmission is not fed back in the second time unit. Optionally, the terminal device does not send the first feedback information to the network device in the third time unit. The third time unit is different from the second time unit. As shown in FIG. 6, the third time unit is a time unit, other than the second time unit, in the fifth time unit set. The fifth time unit is determined based on the first time unit and the time domain offset set K1 set.

It should be understood that if the second PDSCH detected in the time units included in the fourth time unit set is not scheduled by using the fallback DCI, or when the second PDSCH is scheduled by using the fallback DCI but the DAI information included in the fallback DCI indicates that the DAI is not 0 or 1, that is, when the second PDSCH is the dynamic PDSCH, the terminal device needs to determine, based on the K1 set, ACK information or NACK information that is in the second time unit. To be specific, the ACK information or the NACK information in the second time unit corresponds to ACK or NACK information of a PDSCH that may exist in a plurality of downlink time units. In addition, the ACK information or the NACK information of the second PDSCH may alternatively be fed back in another time unit.

Figure 7:
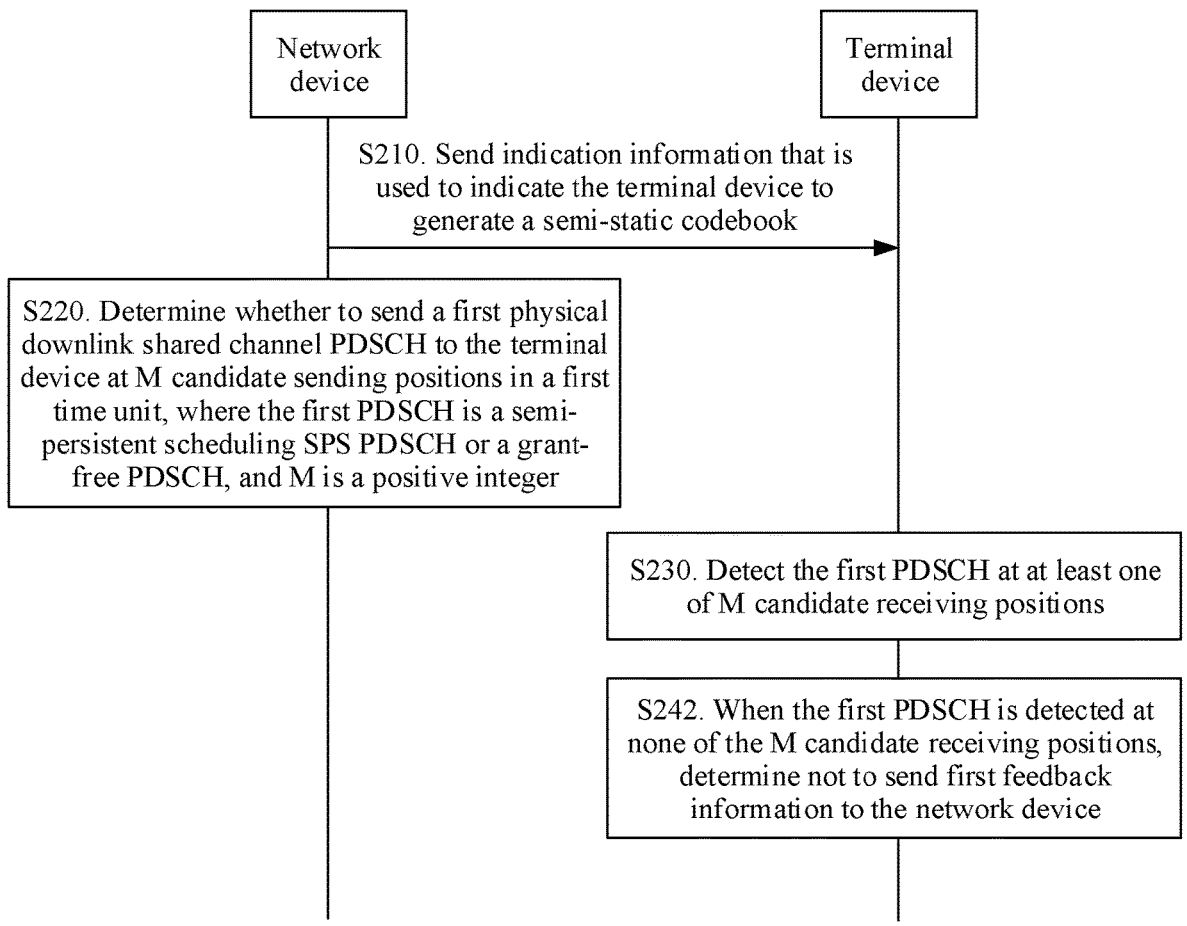
FIG. 7 is a schematic interaction diagram of a feedback information transmission method according to an embodiment of this application.

In an embodiment, FIG. 7 is a schematic interaction diagram of the feedback information transmission method 200 according to another embodiment of this application. In S240, the determining, based on a detection result of the first PDSCH, whether to send first feedback information to the network device includes: S242. When detecting the first PDSCH at none of the M candidate receiving positions, the terminal device determines not to send the first feedback information to the network device.

Specifically, if the terminal device detects, at none of the M candidate receiving positions in the first time unit, that the network device sends data to the terminal device, the terminal device does not send the first feedback information to the network device. That is, the terminal device performs feedback only when detecting the first PDSCH. This can save resources, avoid unnecessary feedback information, and avoid a waste of transmission resources. This improves resource utilization, feedback reliability, and communication efficiency.

Figure 8:
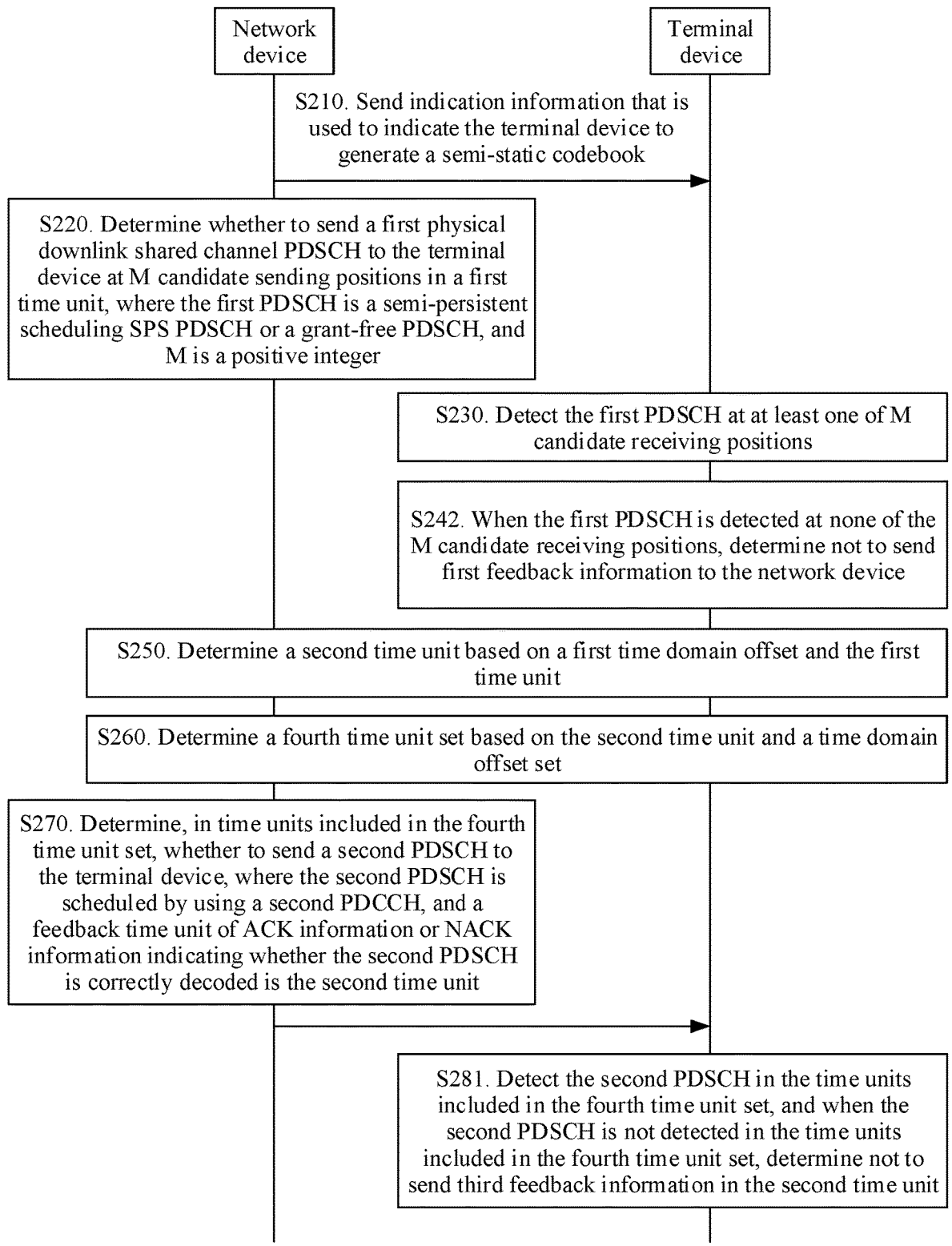
FIG. 8 is a schematic interaction diagram of another feedback information transmission method according to an embodiment of this application.

In an embodiment, FIG. 8 is a schematic interaction diagram of the feedback information transmission method 200 according to another embodiment of this application. In S242, when the terminal device detects the first PDSCH at none of the M candidate receiving positions, the terminal device may further perform steps S250, S260, S270, and S281. In S281, when the terminal device does not detect the second PDSCH in time units included in the fourth time unit set, the terminal device determines not to send the third feedback information to the network device. To be specific, when the first PDSCH is not detected in the first time unit, and the second PDSCH is not detected in the time units included in the fourth time unit set, the ACK information or the NACK information of the first PDSCH and the ACK information or the NACK information of the second PDSCH do not need to be fed back in the second time unit. In other words, no ACK information or NACK information needs to be fed back in the second time unit.

In an embodiment, when the first PDSCH is the SPS PDSCH, the method 200 further includes:

The network device sends a first PDCCH to the terminal device, where the first PDCCH is used to activate transmission of SPS PDSCHs, the first time domain offset is indicated by the first PDCCH, and the first PDCCH further indicates position information of the first SPS PDSCH in the transmission of the SPS PDSCHs. Correspondingly, the terminal device receives the first PDCCH.

Specifically, when the first PDSCH is the SPS PDSCH, because the transmission of the SPS PDSCH needs to be activated by a PDCCH, the network device sends the first PDCCH to the terminal device. The first PDCCH is used to activate the transmission of the SPS PDSCH. The first time domain offset is indicated by the first PDCCH. The first PDCCH indicates the position information of the first SPS PDSCH in the transmission of the SPS PDSCHs. Specifically, the terminal device may determine a time domain offset (such as a slot offset K0) between the PDCCH and the first SPS PDSCH and symbol information of the first SPS PDSCH based on a Time Domain Resource Allocation field (e.g., PDCCH-to-PDSCH-Timing field) in DCI on the first PDCCH. Then, the terminal device obtains a HARQ-ACK timing, namely, the first time domain offset between the SPS PDSCH and the corresponding ACK/NACK feedback, based on the PDSCH-to-HARQ-timing field. For example, the first time domain offset may be a slot offset or a subframe offset. Based on the information, the terminal device may determine the first time domain offset in the transmission of the SPS PDSCHs and the time domain position of the first SPS PDSCH in the transmission of the SPS PDSCHs, and determine a time domain position of each SPS PDSCH based on a periodicity of the SPS PDSCH. The periodicity of the SPS PDSCH may be configured by using a higher layer parameter, or prestored by the terminal device, or predefined in a protocol.

Figure 9:
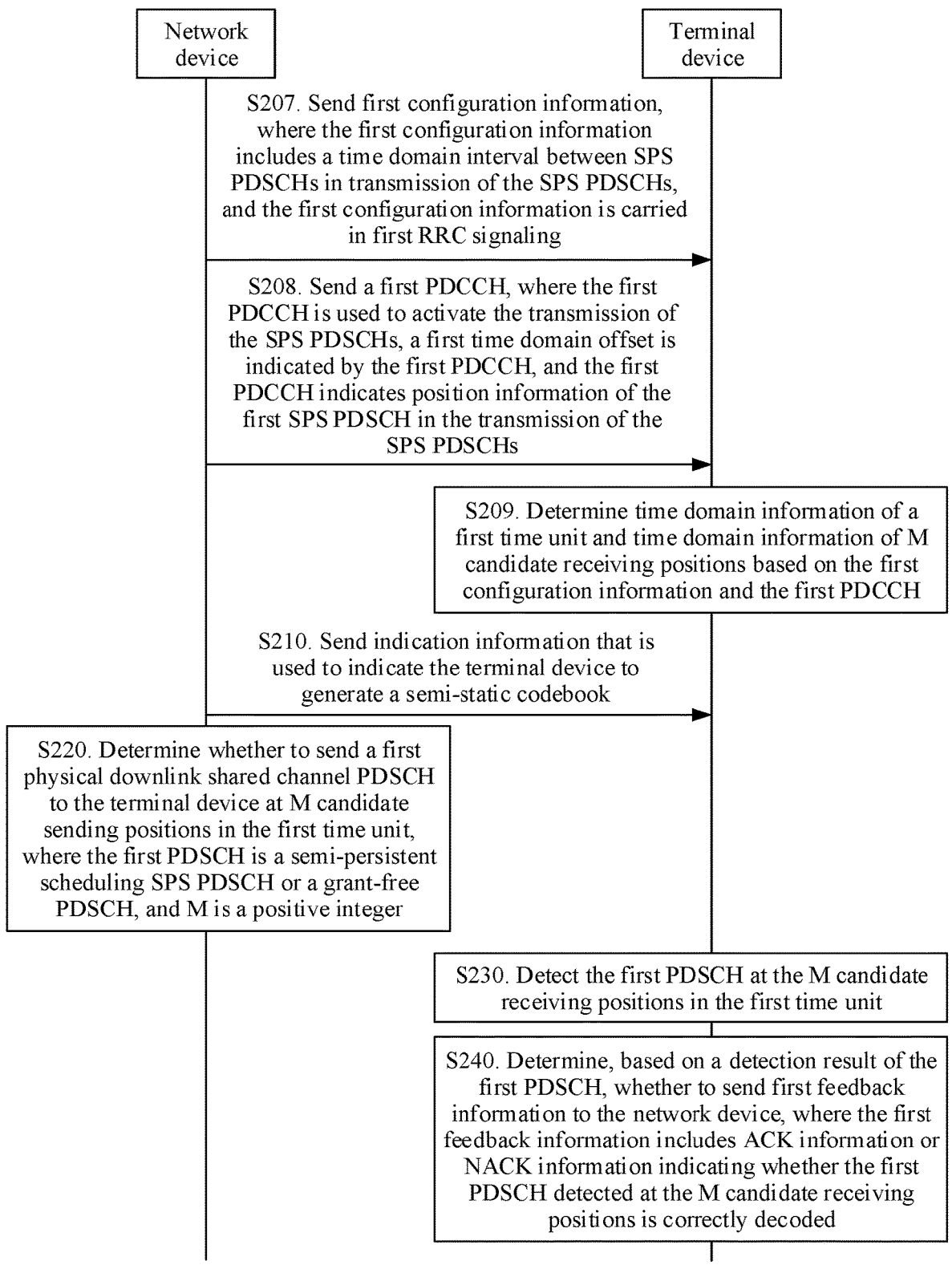
FIG. 9 is a schematic interaction diagram of another feedback information transmission method according to an embodiment of this application.

In an embodiment, FIG. 9 is a schematic interaction diagram of the feedback information transmission method 200 according to another embodiment of this application. The method 200 further includes the following steps.

S207. The network device sends first configuration information to the terminal device, where the first configuration information includes a time domain interval, namely, a periodicity, between the SPS PDSCHs in the transmission of the SPS PDSCHs, and the first configuration information is carried by using first radio resource control (RRC) signaling. In other words, the first configuration information is not transmitted by using DCI on a PDCCH. Correspondingly, the terminal device receives the first configuration information, to be specific, receives the first configuration information by using the first RRC signaling.

S208. The terminal device receives the first PDCCH from the network device.

S209. The terminal device determines time domain information of the first time unit and time domain information of the M candidate receiving positions based on the first configuration information and the first PDCCH.

Specifically, after receiving the first PDCCH sent by the network device, the terminal device may determine the first time domain offset in the transmission of the SPS PDSCHs and the time domain position of the first SPS PDSCH in the transmission of the SPS PDSCHs. The network device further needs to notify the terminal device of a specified SPS PDSCH transmission periodicity, in other words, needs to notify the terminal device of the time domain interval between the SPS PDSCHs in the transmission of the SPS PDSCHs. Therefore, the network device sends the first configuration information to the terminal device, where the first configuration information includes the time domain interval between the SPS PDSCHs in the transmission of the SPS PDSCHs. The terminal device determines, based on the first time domain offset in the transmission of the SPS PDSCHs, the time domain position of the first SPS PDSCH in the transmission of the SPS PDSCHs, and the SPS PDSCH transmission periodicity, the time domain information of the first time unit and the time domain information of the M candidate receiving positions. In other words, the time domain position of the first time unit and time domain positions of the M candidate receiving positions may be determined, so that the SPS PDSCH can be detected at a correct position. Efficiency and accuracy of detecting the SPS PDSCH by the terminal device are improved, and communication resources are saved.

Figure 10:
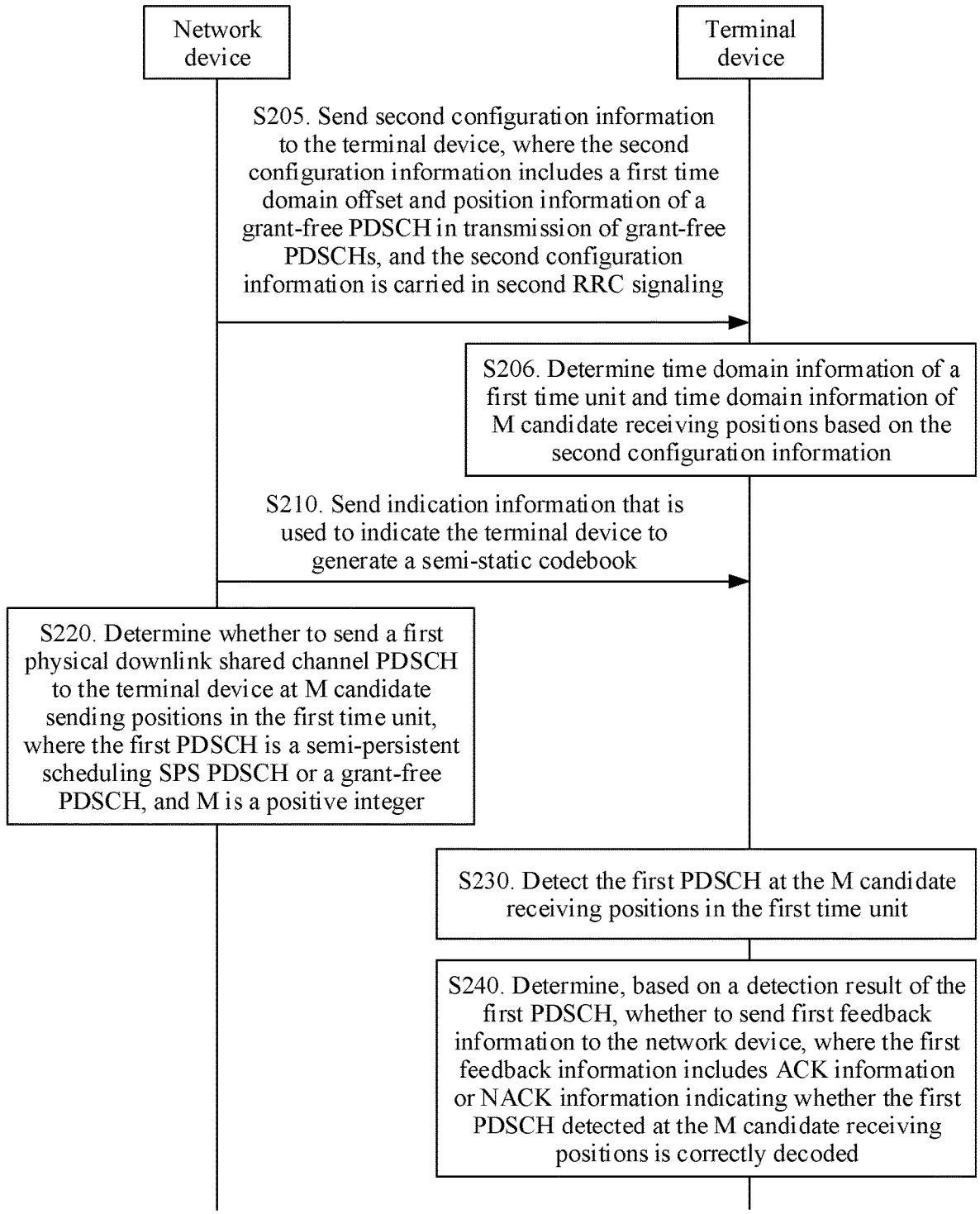
FIG. 10 is a schematic interaction diagram of another feedback information transmission method according to an embodiment of this application.

In an embodiment, FIG. 10 is a schematic interaction diagram of the feedback information transmission method 200 according to another embodiment of this application. As shown in FIG. 10, when the first PDSCH is the grant-free PDSCH, the method 200 further includes the following steps.

S205. The network device sends second configuration information to the terminal device, where the second configuration information includes the first time domain offset and position information of the grant-free PDSCH in transmission of grant-free PDSCHs, and the second configuration information is carried by using second RRC signaling. In other words, the second configuration information is not transmitted by using DCI on a PDCCH. Correspondingly, the terminal device receives the second configuration information, to be specific, receives the second configuration information by using the second RRC signaling.

S206. The terminal device determines time domain information of the first time unit and time domain information of the M candidate receiving positions based on the second configuration information.

Specifically, when the first PDSCH is the grant-free PDSCH, because the transmission of the grant-free PDSCH does not need to be activated by an activation PDCCH, when the first PDSCH is the grant-free PDSCH, the network device needs to notify the terminal device of a related configuration of the grant-free PDSCH transmission. Therefore, the network device sends the second configuration information to the terminal device. The second configuration information includes the first time domain offset K1 and the position information of the grant-free PDSCH in the transmission of the grant-free PDSCHs. The position information of the grant-free PDSCH may include a periodicity of the grant-free PDSCH, a time-frequency position of the first grant-free PDSCH in the transmission of the grant-free PDSCHs, and the like. The first time domain offset K1 is used to determine a time-frequency position of ACK or NACK feedback information corresponding to data sent on the grant-free PDSCH. The terminal device determines the time domain information of the first time unit and the time domain information of the M candidate receiving positions based on the position information of the grant-free PDSCH and the first time domain offset K1. In other words, the time domain position of the first time unit and time domain positions of the M candidate receiving positions may be determined, so that the grant-free PDSCH can be detected at a correct position. Efficiency and accuracy of detecting the grant-free PDSCH by the terminal device are improved, and communication resources are saved.

The following describes, with reference to specific examples, the feedback information transmission method provided in this application.

Figure 11:
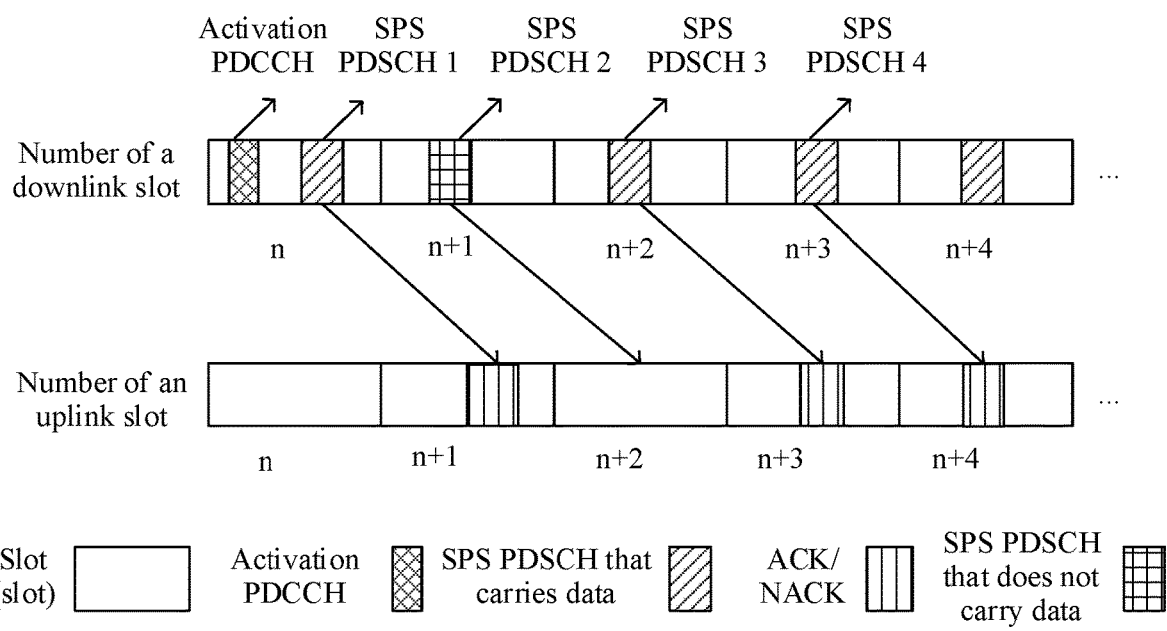
FIG. 11 is a schematic diagram of another feedback information transmission method according to an embodiment of this application.

FIG. 11 is a schematic diagram of a feedback information transmission method according to an embodiment of this application. As shown in FIG. 11, a network device indicates a terminal device to generate a semi-static codebook. The terminal device receives an activation PDCCH sent by the network device. The activation PDCCH indicates that a time domain offset of an SPS PDSCH is one slot. A transmission periodicity that is of the SPS PDSCH and that is configured by using a higher layer is one slot. That is, one time unit is one slot (a first time unit is one slot). Only one SPS PDSCH is transmitted in each slot. A PUCCH resource for feeding back ACK or NACK information is a PUCCH 1. In this embodiment, only an example in which feedback is performed at a transport block (TB) granularity and one SPS PDSCH carries only one TB is used for description. 1-bit ACK/NACK information needs to be fed back. However, the method provided in this application may be applied to a scenario in which one SPS PDSCH carries a plurality of TBs (multi-bit ACK/NACK information needs to be fed back), and/or feedback is performed at a code block group (CBG) granularity (in other words, ACK/NACK information is feedback on each of a plurality of CBGs included in one TB).

It is assumed that the network device sends the activation PDCCH to the terminal device in a slot n, to activate transmission of SPS PDSCHs, and the activation PDCCH indicates that the first SPS PDSCH (an SPS PDSCH 1) is transmitted on the $5^{th}$ to $11^{th}$ symbols in the slot n and a slot offset K1 for feeding back a HARQ-ACK is equal to 1.

The terminal device receives the activation PDCCH and the SPS PDSCH 1 in the slot n. It is assumed that the activation PDCCH is successfully received, the SPS PDSCH 1 is successfully decoded, and feedback information of the SPS PDSCH 1 is generated as an ACK 1.

Before an SPS PDSCH 2 in a slot n+1 is sent, downlink data of the terminal device does not arrive at the network device, and all data arrived before the slot n+1 is sent to the terminal device. The network device does not send data to the terminal device on the SPS PDSCH 2. The terminal device attempts to receive the SPS PDSCH 2 in the slot n+1, finds, through energy detection or DMRS detection, that there is no data sent to the terminal device on the SPS PDSCH 2, and generates feedback information of the SPS PDSCH 2 as DTX. In addition, the terminal device determines, based on the indication of the activation PDCCH, that ACK/NACK information of the SPS PDSCH 1 needs to be fed back in the slot n+1, and selects, based on a higher layer configuration, a PUCCH resource 1 in the slot n+1 to send the ACK 1. In addition, the ACK/NACK information of the SPS PDSCH 1 is fed back only in the slot n+1, and the NACK information or DTX of the SPS PDSCH 1 is not fed back in any other slot.

Before an SPS PDSCH 3 in a slot n+2, downlink data of the terminal device arrives at the network device, and the network device sends the SPS PDSCH 3 to the terminal device.

The terminal device attempts to receive the SPS PDSCH 3 in the slot n+2, and the DMRS detection succeeds but decoding fails. In this case, feedback information of the SPS PDSCH 3 is generated as a NACK 3. In addition, the terminal device determines, based on the indication of the activation PDCCH, that ACK/NACK information of the SPS PDSCH 2 needs to be fed back in the slot n+2. However, because the ACK/NACK information of the SPS PDSCH 2 is the DTX, the terminal device does not send the ACK/NACK information in the slot n+2. In other words, the terminal device does not send ACK/NACK feedback information to the network device in the slot n+2.

Before an SPS PDSCH 4 in a slot n+3, downlink data of the terminal device arrives at the network device, and the network device sends the SPS PDSCH 4 to the terminal device.

The terminal device attempts to receive the SPS PDSCH 4 in the slot n+3, and the DMRS detection succeeds and decoding succeeds. In this case, feedback information of the SPS PDSCH 4 is generated as an ACK 4. In addition, the terminal device determines, based on the indication of the activation PDCCH, that ACK/NACK information of the SPS PDSCH 3 needs to be fed back in the slot n+3, and selects, based on a higher layer configuration, a PUCCH 1 in the slot n+3 to send the NACK 3. In addition, the ACK/NACK information of the SPS PDSCH 3 is fed back only in the slot n+3, and the NACK information or DTX of the SPS PDSCH 3 is not fed back in any other slot. It should be understood that, if the network device schedules one second PDSCH by sending a format of fallback DCI and DAI information included in the fallback DCI indicates that a DAI is 0 or 1, assuming that the second PDSCH is sent to the terminal device in the downlink slot n+1, and ACK/NACK information corresponding to the second PDSCH also needs to be fed back in the slot n+3, only the ACK/NACK information of the SPS PDSCH 3 and the ACK/NACK information of the second PDSCH are fed back in the slot n+3. The NACK information or DTX of the second PDSCH and the NACK information or the DTX of the SPS PDSCH 3 are not fed back in any other slot.

Figure 12:
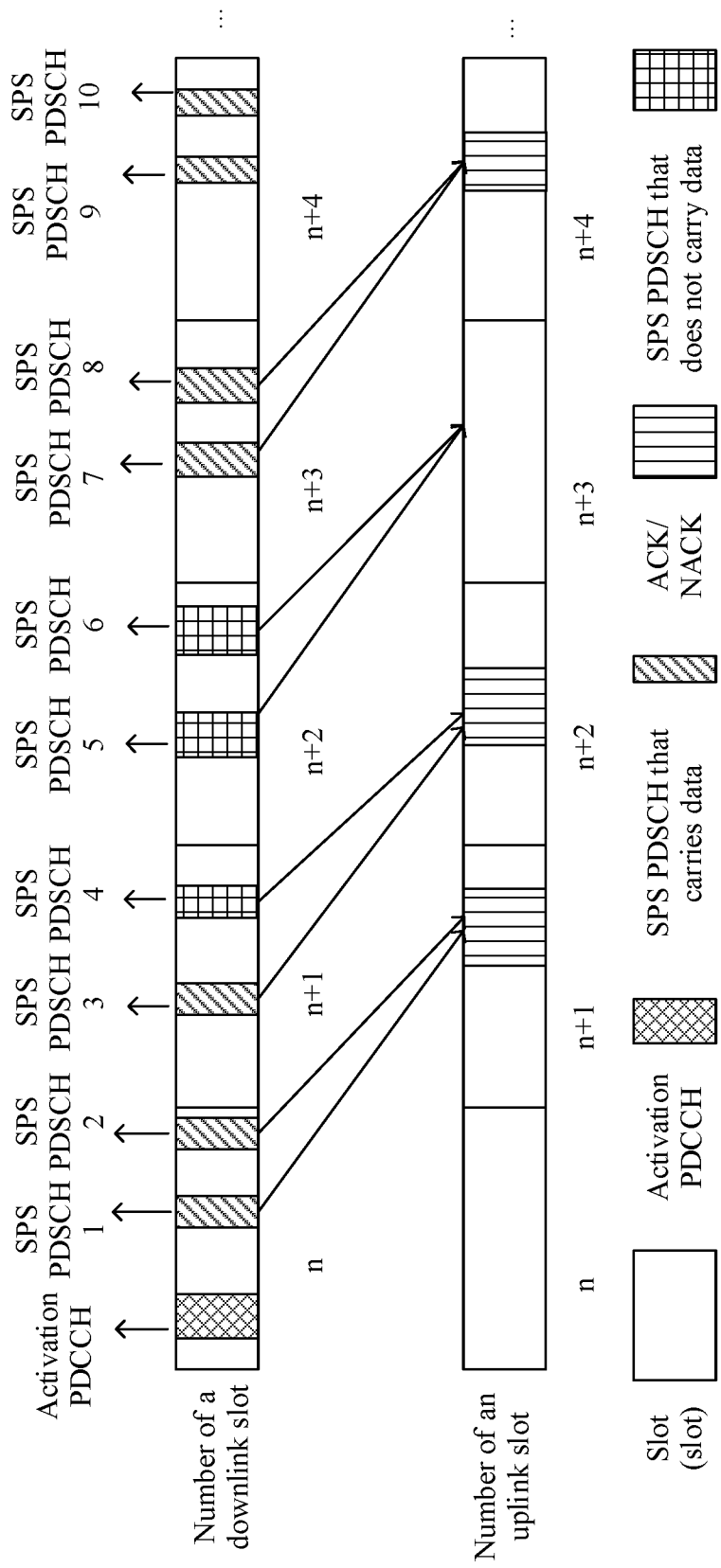
FIG. 12 is a schematic diagram of still another feedback information transmission method according to an embodiment of this application.

FIG. 12 is a schematic diagram of a feedback information transmission method according to another embodiment of this application. As shown in FIG. 12, a network device indicates a terminal device to generate a semi-static codebook. The terminal device receives an activation PDCCH sent by the network device. The activation PDCCH indicates that a time domain offset of an SPS PDSCH is one slot. A transmission periodicity that is of the SPS PDSCH and that is configured by using a higher layer is seven symbols. That is, one time unit is one slot (i.e., a first time unit is one slot). Only two SPS PDSCHs are transmitted in each slot. In addition, a PUCCH resource for feeding back ACK or NACK information is a PUCCH 1, and feedback needs to be performed only at a transport block (TB) granularity. One SPS PDSCH carries only one TB.

As shown in FIG. 12, it is assumed that the network device sends the activation PDCCH to the terminal device in a slot n, to activate transmission of SPS PDSCHs. Assuming that the activation PDCCH is successfully received, and the activation PDCCH indicates that the first SPS PDSCH (e.g., an SPS PDSCH 1) is transmitted on the $5^{th}$ and $6^{th}$ symbols in the slot n, a slot offset K1 for feeding back a HARQ-ACK is equal to 1.

The terminal device receives the SPS PDSCH 1 on the $5^{th}$ and $6^{th}$ symbols in the slot n, and receives an SPS PDSCH 2 on the $12^{th}$ and the $13^{th}$ symbols in the slot n. The terminal device receives the activation PDCCH, the SPS PDSCH 1, the SPS PDSCH 2 in the slot n. The SPS PDSCH 1 is successfully decoded. For the SPS PDSCH 2, DMRS detection succeeds, but decoding fails. Therefore, feedback information of the SPS PDSCH 1 is generated as an ACK 1, and feedback information of the SPS PDSCH 2 is generated as a NACK 2.

Before an SPS PDSCH 3 in a slot n+1 is sent, downlink data of the terminal device arrives at the network device, and the network device sends the data to the terminal device on the SPS PDSCH 3. Before a next SPS PDSCH 4 is sent, downlink data of the terminal device does not arrive at the network device, all data arrived at the network device previously is sent to the terminal device, and the network device does not send the data to the terminal device on the SPS PDSCH 4.

The terminal device attempts to receive the SPS PDSCH 3 and the SPS PDSCH 4 in the slot n+1. For the SPS PDSCH 3, decoding succeeds. For the SPS PDSCH 4, it is found, through energy detection or DMRS detection, that there is no data sent to the terminal device on the SPS PDSCH 4. Therefore, feedback information of the SPS PDSCH 3 is generated as an ACK 3, and feedback information of the SPS PDSCH 4 is generated as DTX 4. In addition, the terminal device determines, based on the indication of the activation PDCCH, that ACK or NACK information of the SPS PDSCH 1 and ACK or NACK information of the SPS PDSCH 2 need to be fed back in the slot n+1, and selects, based on a higher layer configuration, a PUCCH 1 in the slot n+1 to send the feedback information {ACK 1, NACK 2}. In addition, the ACK/NACK information of the SPS PDSCH 1 and the ACK/NACK information of the SPS PDSCH 2 are fed back only in the slot n+1, and the NACK information or DTX of the SPS PDSCH 1 and the NACK information or DTX of the SPS PDSCH 2 are not fed back in any other slot.

In a slot n+2, data of the terminal device does not arrive at the network device, and the network device does not send data to the terminal device on a corresponding SPS PDSCH 5 and SPS PDSCH 6.

The terminal device attempts to receive the SPS PDSCH 5 and the SPS PDSCH 6 in the slot n+2, and finds, through energy detection or DMRS detection, that there is no data sent to the terminal device on the SPS PDSCH 5 and the SPS PDSCH 6. Therefore, feedback information of the SPS PDSCH 5 is generated as DTX 5, and the SPS PDSCH 6 is generated as DTX 6. In addition, the UE determines, based on the indication of the activation PDCCH, that ACK/NACK information of the SPS PDSCH 3 and ACK/NACK information of the SPS PDSCH 4 need to be fed back in the slot n+2. However, because the SPS PDSCH 3 is successfully detected, the ACK/NACK information needs to be fed back. In addition, because the ACK/NACK information of the SPS PDSCH 4 is the DTX, the terminal device maps the DTX to the NACK information. Therefore, the terminal device sends feedback information {ACK 3, NACK 4} on a PUCCH 1 in the slot n+2. In addition, the terminal device feeds back the ACK/NACK information of the SPS PDSCH 3 and the ACK/NACK information of the SPS PDSCH 4 only in the slot n+2, and does not feed back the NACK information or DTX of the SPS PDSCH 3 and the NACK information or DTX of the SPS PDSCH 4 in any other slot. It should be understood that, if the network device schedules one second PDSCH by sending a format of fallback DCI and DAI information included in the fallback DCI indicates that a DAI is 0 or 1, assuming that the second PDSCH is sent to the terminal device in the downlink slot n+1, and ACK/NACK information corresponding to the second PDSCH also needs to be fed back in the uplink slot slot n+2, the terminal device only needs to further feed back the ACK/NACK information of the second PDSCH in the slot n+2. That is, the terminal device feeds back only the ACK/NACK information of the SPS PDSCH 3 and the ACK/NACK information of the second PDSCH in the slot n+2. The NACK information or DTX of the second PDSCH and the NACK information or the DTX of the SPS PDSCH 3 are not fed back in any other slot.

In a slot n+3, data of the terminal device arrives at the network device, and the network device sends the data to the terminal device on a corresponding SPS PDSCH 7 and SPS PDSCH 8. The terminal device attempts to receive the SPS PDSCH 7 and the SPS PDSCH 8 in the slot n+3. For both the SPS PDSCH 7 and the SPS PDSCH 8, DMRS detection and decoding succeed. Therefore, feedback information of the SPS PDSCH 7 is generated as an ACK 7, and feedback information of the SPS PDSCH 8 is generated as an ACK 8. In addition, the terminal device determines, based on the indication of the activation PDCCH, that ACK/NACK information of the SPS PDSCH 5 and ACK/NACK information of the SPS PDSCH 6 need to be fed back in the slot n+3.

However, because the ACK/NACK information of the SPS PDSCH 5 and the ACK/NACK information of the SPS PDSCH 6 are both DTX, the terminal device does not send any feedback information in the slot n+3, in other words, does not send feedback information of the SPS PDSCH 5 and the SPS PDSCH 6 to the network device in the slot n+3.

It should be understood that FIG. 11 and FIG. 12 are merely examples, and should not constitute any limitation on this embodiment of this application. For example, the periodicity of the SPS PDSCH may alternatively be another value, the time domain offset may alternatively be another value, the SPS PDSCH may alternatively be transmitted in more slots, and one time unit may alternatively be one subframe or one TTI. This is not limited in this application.

It should be further understood that when the network device sends the data to the terminal device on a grant-free PDSCH, the SPS PDSCH may be the grant-free PDSCH. A time domain offset corresponding to the grant-free PDSCH, position information of each grant-free PDSCH in transmission of grant-free PDSCHs, and the like may be notified by the network device to the terminal device based on configuration information. The position information of the grant-free PDSCH may include a periodicity of the grant-free PDSCH, a time-frequency position of the first grant-free PDSCH in the transmission of the grant-free PDSCHs, and the like. The position information of the grant-free PDSCH is used by the terminal device to determine a position of each grant-free PDSCH to be detected, and detects the grant-free PDSCH based on the time-frequency position information of the grant-free PDSCH. A subsequent feedback process is similar to the foregoing SPS PDSCH feedback process. For similar descriptions, refer to the foregoing descriptions of the SPS PDSCH. For brevity, details are not described herein again.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, the first, the second, and the like are merely used to indicate that a plurality of objects are different. For example, a first time unit and a third time unit are merely used to indicate different time units, but should not affect a time unit. The foregoing first, second, and the like should not constitute any limitation on the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200 may be unnecessary, or some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein.

It should be further understood that sequence numbers of the foregoing processes do not mean execution sequences.

The execution sequences of the processes should be determined based on functions and internal logic of the processes, and should not constitute any limitation on implementation processes of the embodiments of this application.

It should be further understood that in the embodiments of this application, "presetting" and "predefinition" may be implemented by prestoring, in a device (including, for example, a terminal device and a network device), corresponding code, a corresponding table, or another manner that may be used to indicate related information. A specific implementation is not limited in this application.

The foregoing describes in detail the feedback information transmission method in the embodiments of this application with reference to FIG. 3 to FIG. 12. The following describes in detail the communications apparatuses in the embodiments of this application with reference to FIG. 13 to FIG. 16.

Figure 13:
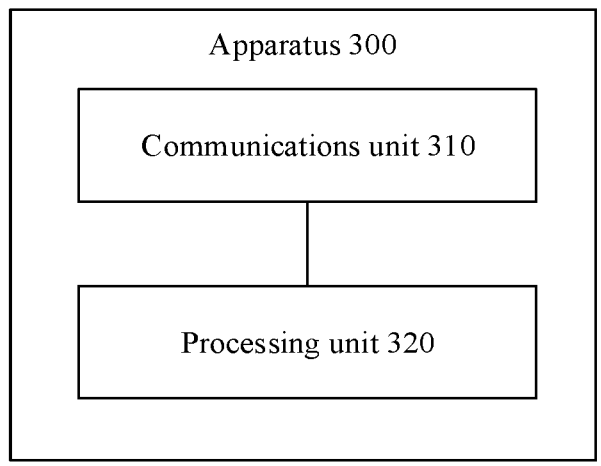
FIG. 13 is a schematic diagram of a communications apparatus according to an embodiment of this application.

FIG. 13 is a schematic block diagram of a communications apparatus 300 according to an embodiment of this application. The apparatus 300 may correspond to the terminal device described in the method 200, or may be a chip or a component used in the terminal device. Modules or units in the apparatus 300 are configured to perform actions or processing processes performed by the terminal device in the foregoing method 200. As shown in FIG. 13, the communications apparatus 300 may include a communications unit 310 and a processing unit 320.

The communications unit 310 is configured to receive indication information from a network device. The indication information indicates to generate a semi-static codebook.

The processing unit 320 is configured to detect a first physical downlink shared channel PDSCH at M candidate receiving positions in a first time unit. The first PDSCH is an SPS PDSCH or a grant-free PDSCH, and M is a positive integer.

The processing unit 320 is further configured to determine, based on a detection result of the first PDSCH, whether to send first feedback information to the network device. The first feedback information includes acknowledgement ACK information or negative acknowledgement NACK information indicating whether the first PDSCH detected at the M candidate receiving positions is correctly decoded.

It should be understood that for a specific process of performing the foregoing corresponding steps by the units in the apparatus 300, refer to the foregoing descriptions with reference to the method embodiments in FIG. 3 to FIG. 12. For brevity, details are not described herein again.

Figure 14:
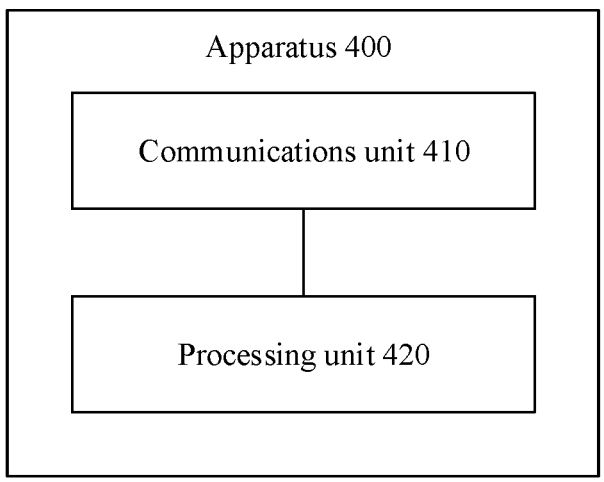
FIG. 14 is a schematic diagram of still another communications apparatus according to an embodiment of this application.

FIG. 14 is a schematic block diagram of a communications apparatus 400 according to an embodiment of this application. The apparatus 400 may correspond to the network device described in the method 200, or may be a chip or a component used in the network device. Modules or units in the apparatus 400 are configured to perform actions or processing processes performed by the network device in the foregoing method 200. As shown in FIG. 14, the communications apparatus 400 may include a communications unit 410 and a processing unit 420.

The communications unit 410 is configured to send indication information to a terminal device. The indication information indicates the terminal device to generate a semi-static codebook.

The processing unit 420 is configured to determine whether to send a first physical downlink shared channel PDSCH to the terminal device at M candidate sending positions in a first time unit. The first PDSCH is an SPS PDSCH or a grant-free PDSCH, and M is a positive integer.

The processing unit 420 is further configured to determine, depending on whether the first PDSCH is sent to the terminal device at the M candidate sending positions, whether to receive first feedback information from the terminal device. The first feedback information includes acknowledgement ACK information or negative acknowledgement NACK information indicating whether the terminal device correctly decodes the first PDSCH detected at the M candidate sending positions.

It should be understood that for a specific process of performing the foregoing corresponding steps by the units in the apparatus 400, refer to the foregoing descriptions with reference to the method embodiments in FIG. 3 to FIG. 12. For brevity, details are not described herein again.

It should be further understood that division into the units in the apparatuses is merely logical function division. In embodiments of an actual implementation, all or some of the units may be integrated into one physical entity, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In embodiments of an implementation process, the steps in the foregoing methods or the foregoing units may be implemented by using a hardware integrated logic circuit of the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more digital signal processors (DSP), one or more field programmable gate arrays (FPGA), or a combination of at least two of these integrated circuits. For another example, when a unit in the apparatus is implemented by a program scheduled by a processing element, the processing element may be a general purpose processor, for example, a central processing unit (CPU) or another processor that can invoke the program. For still another example, the units may be integrated and implemented in a form of a system-on-a-chip (SOC).

Figure 15:
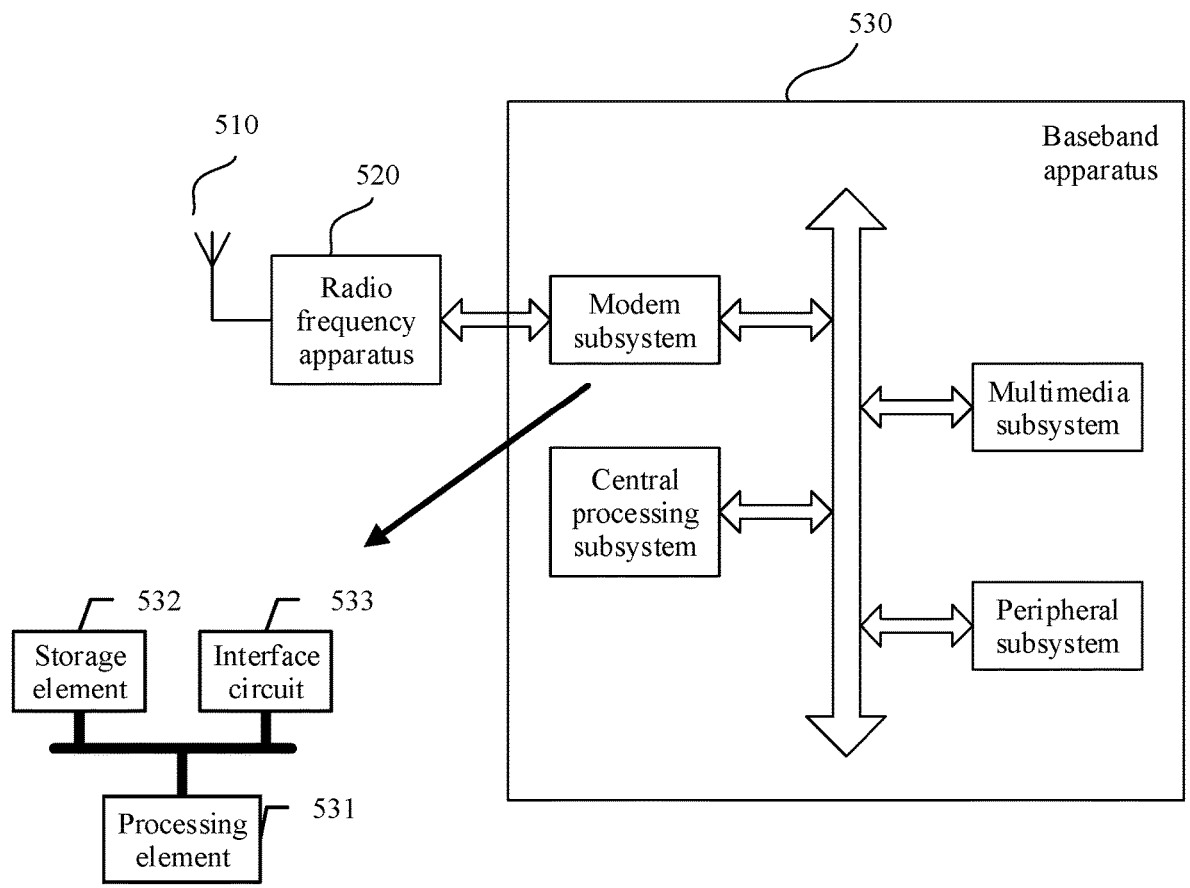
FIG. 15 is a schematic diagram of a terminal device according to an embodiment of this application.

FIG. 15 is a schematic structural diagram of a terminal device according to an embodiment of this application. The terminal device may be the terminal device in the foregoing embodiments and is configured to implement operations of the terminal device in the foregoing embodiments. As shown in FIG. 15, the terminal device includes an antenna 510, a radio frequency apparatus 520, and a signal processing part 530. The antenna 510 is connected to the radio frequency apparatus 520. In a downlink direction, the radio frequency apparatus 520 receives, through the antenna 510, information sent by a network device, and sends, to the signal processing part 530 for processing, the information sent by the network device. In an uplink direction, the signal processing part 530 processes information of the terminal device, and sends the information to the radio frequency apparatus 520. The radio frequency apparatus 520 processes the information of the terminal device, and then sends the processed information to the network device through the antenna 510.

The signal processing part 530 may include a modem subsystem, configured to process data at each communications protocol layer. The signal processing part 530 may further include a central processing subsystem, configured to implement processing of an operating system and an application layer of the terminal. In addition, the signal processing part 530 may further include another subsystem such as a multimedia subsystem or a peripheral subsystem. The multimedia subsystem is configured to control a camera or a screen display of the terminal device, and the peripheral subsystem is configured to implement a connection to another device. The modem subsystem may be an independent chip. Optionally, the foregoing apparatus used for the terminal may be located in the modem subsystem.

The modem subsystem may include one or more processing elements 531, for example, include one main control CPU and another integrated circuit. In addition, the modem subsystem may further include a storage element 532 and an interface circuit 533. The storage element 532 is configured to store data and a program, but the program used to perform the method performed by the terminal device in the foregoing method may not be stored in the storage element 532, but is stored in a memory outside the modem subsystem. The interface circuit 533 is configured to communicate with another subsystem. The foregoing apparatus used for the terminal device may be located in the modem subsystem, and the modem subsystem may be implemented by a chip. The chip includes at least one processing element and an interface circuit. The processing element is configured to perform the steps of any one of the methods performed by the terminal device. The interface circuit is configured to communicate with another apparatus. In embodiments of an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In embodiments of another implementation, the program used to perform the methods performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still embodiments of another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the embodiments and steps in the foregoing methods may be integrated together, and implemented in a form of a system on-a-chip (SOC). The SOC is configured to implement the foregoing methods.

Figure 16:
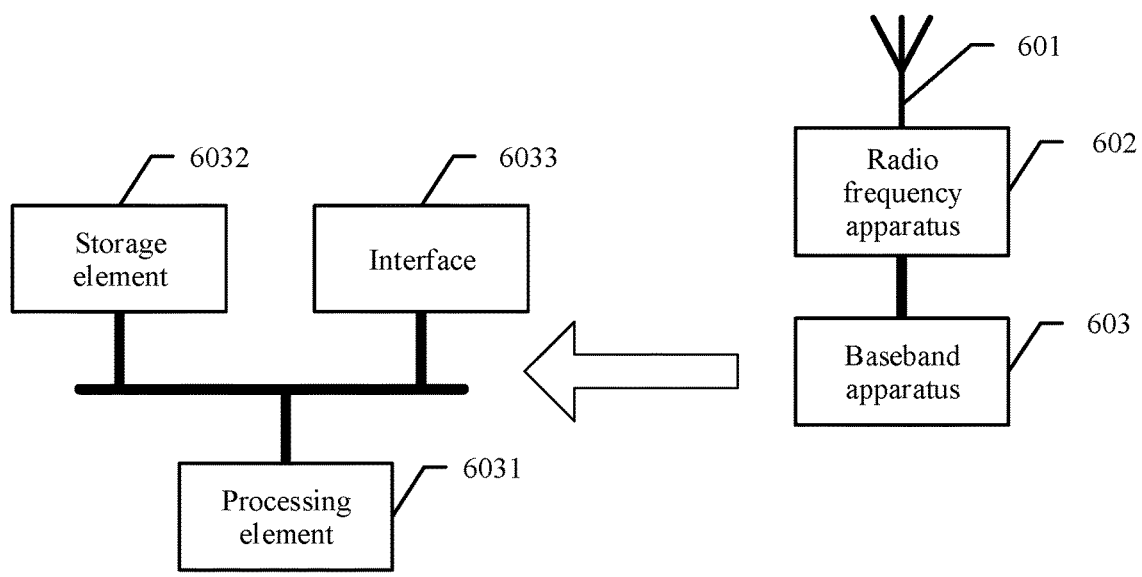
FIG. 16 is a schematic diagram of a network device according to an embodiment of this application.

FIG. 16 is a schematic structural diagram of a network device according to an embodiment of this application. The network device is configured to implement operations of the network device in the foregoing embodiments. As shown in FIG. 16, the network device includes an antenna 601, a radio frequency apparatus 602, and a baseband apparatus 603. The antenna 601 is connected to the radio frequency apparatus 602. In an uplink direction, the radio frequency apparatus 602 receives, through the antenna 601, information sent by a terminal, and sends the information sent by the terminal device to the baseband apparatus 603 for processing. In a downlink direction, the baseband apparatus 603 processes the information of the terminal, and sends the information to the radio frequency apparatus 602. The radio frequency apparatus 602 processes the information of the terminal device, and then sends the processed information to the terminal through the antenna 601.

The baseband apparatus 603 may include one or more processing elements 6031, for example, include one main control CPU and another integrated circuit. In addition, the baseband apparatus 603 may further include a storage element 6032 and an interface 6033. The storage element 6032 is configured to store a program and data. The interface 6033 is configured to exchange information with the radio frequency apparatus 602, and the interface is, for example, a common public radio interface (CPRI). The foregoing apparatus used for the network device may be located in the baseband apparatus 603. For example, the foregoing apparatus used for the network device may be a chip on the baseband apparatus 603. The chip includes at least one processing element and an interface circuit. The processing element is configured to perform the steps of any one of the methods performed by the network device. The interface circuit is configured to communicate with another apparatus. In embodiments of an implementation, units of the network device that implement the steps in the foregoing methods may be implemented by a program scheduled by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In embodiments of another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system-on-a-chip. For example, the baseband apparatus includes the SOC chip, configured to implement the foregoing methods.

The terminal device and the network device in the foregoing apparatus embodiments may completely correspond to the terminal device or the network device in the method embodiments, and a corresponding module or unit performs a corresponding step. For example, when the apparatus is implemented by a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

An embodiment of this application further provides a communications system. The communications system includes the foregoing terminal device and the foregoing network device.

An embodiment of this application further provides a computer-readable medium, configured to store computer program code. The computer program code includes an instruction used to perform the feedback information transmission method in the embodiments of this application in the method 200. The computer-readable medium may be a read-only memory (ROM) or a random access memory (RAM). This is not limited in this embodiment of this application.

This application further provides a computer program product. The computer program product includes an instruction. When the instruction is executed, the terminal device and the network device perform operations corresponding to the terminal device and the network device in the foregoing methods.

An embodiment of this application further provides a system chip. The system chip includes a processing unit and a communications unit. The processing unit may be, for example, a processor, and the communications unit may be, for example, an input/output interface, a pin, or a circuit. The processing unit may execute a computer instruction, so that a chip in the communications apparatus performs feedback information transmission method provided in the foregoing embodiments of this application.

Optionally, the computer instruction is stored in a storage unit.

Optionally, the storage unit is a storage unit in the chip, for example, a register or a cache, or the storage unit may be a storage unit in a terminal but outside the chip, for example, a read-only memory (ROM) or another type of static storage device capable of storing static information and instructions, or a random access memory (RAM). The processor mentioned in any one of the foregoing descriptions may be a CPU, a microprocessor, an ASIC, or one or more integrated circuits used to control program execution of the feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a nonvolatile memory, or may include both a volatile memory and a nonvolatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Terms "system" and "network" may be used interchangeably in this specification. The term "and/or" in this specification is only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the "uplink" and the "downlink" are only used to describe transmission directions of data/information, and neither a specific start device nor a specific end device of the data/information transmission is limited.

Names may be assigned to various objects that may appear in this application, for example, various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

All or some of the methods in the embodiments of this application may be implemented by software, hardware, firmware, or any combination thereof. When the software is used to implement the embodiments, the embodiments may be implemented completely or partially in a form of a computer program product. The computer program product includes one or more computer programs or instructions. When the computer program or the instruction is loaded and executed on a computer, procedures or functions in the embodiments of this application are all or partially performed. The computer may be a general-purpose computer, a dedicated computer, a computer network, or another programmable apparatus. The computer program or instruction may be stored in a computer-readable storage medium, or may be transmitted via the computer-readable storage medium. The computer-readable storage medium may be any usable medium accessible by a computer, or a data storage device, such as a server integrating one or more usable media. The usable medium may be a magnetic medium such as a floppy disk, a hard disk, or a magnetic tape, or may be an optical medium such as a CD-ROM or a DVD, or may be a semiconductor medium such as a solid-state drive (SSD), a random access memory (RAM), a read-only memory (ROM), or a register.

It may be clearly understood by a person skilled in the art that, for the purpose of convenient and brief description, for a detailed working process of the foregoing system, apparatuses, and units, refer to a corresponding process in the foregoing method embodiments, and details are not described herein.

In the several embodiments provided in this application, it should be understood that the disclosed system, apparatuses, and methods may be implemented in other manners. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located at one position, or may be distributed on a plurality of network units. Some or all of the units may be selected based on actual requirements to achieve the objectives of the solutions of the embodiments.

What is claimed is:

1. A feedback information transmission method, comprising:
   receiving indication information from a network device, wherein the indication information indicates a semi-static codebook is to be generated;
   detecting a first physical downlink shared channel (PDSCH) at M candidate receiving positions in a first time unit, wherein the first PDSCH is a semi-persistent scheduling (SPS) PDSCH or a grant-free PDSCH, and M is a positive integer; and
   determining, based on a detection result of the first PDSCH, whether to send first feedback information to the network device, wherein the first feedback information comprises acknowledgement (ACK) information or negative acknowledgement (NACK) information indicating whether the first PDSCH detected at the M candidate receiving positions is correctly decoded;
   wherein the determining, based on the detection result of the first PDSCH, whether to send first feedback information to the network device comprises:
   when the first PDSCH is detected at at least one of the M candidate receiving positions, determining to send the first feedback information to the network device; and
   the method further comprises:
      determining a second time unit based on a first time domain offset and the first time unit,
      determining a fourth time unit set based on the second time unit and a time domain offset set, wherein the time domain offset set comprises the first time domain offset,
      detecting a second PDSCH in time units comprised in the fourth time unit set, wherein the second PDSCH is scheduled using a second physical downlink control channel (PDCCH), and a feedback time unit of ACK or NACK information indicating whether the second PDSCH is correctly decoded is the second time unit,
      determining based on a detection result of the second PDSCH, second feedback information sent in the second time unit, wherein the second feedback information comprises the ACK information or the NACK information indicating whether the first PDSCH is correctly decoded, and
      sending the second feedback information to the network device in the Second time unit.

2. The method according to claim 1, wherein when the second PDSCH is not detected in the time units comprised in the fourth time unit set, the second feedback information comprises only the first feedback information.

3. The method according to claim 1, wherein when only one second PDSCH is detected in the time units comprised in the fourth time unit set, the second PDSCH is scheduled using fallback downlink control information (DCI) on the second PDCCH, and a downlink assignment index (DAI) in the DCI is 1 or 0, the second feedback information comprises only the first feedback information and third feedback information, and the third feedback information comprises ACK information or NACK information indicating whether the detected second PDSCH is correctly decoded.

4. The method according to claim 1, wherein the determining, based on the detection result of the first PDSCH, whether to send first feedback information to the network device comprises:
   when the first PDSCH is detected at none of the M candidate receiving positions, determining not to send the first feedback information to the network device.

5. The method according to any claim 1, wherein when the first PDSCH is the SPS PDSCH, the method further comprises:
   receiving a first PDCCH from the network device, wherein the first PDCCH is used to activate transmission of SPS PDSCHs, a first time domain offset is indicated by the first PDCCH, and the first PDCCH further indicates position information of the first SPS PDSCH in the transmission of the SPS PDSCHs.

6. The method according to claim 1, wherein when the first PDSCH is the grant-free PDSCH, the method further comprises:
   receiving second configuration information from the network device, wherein the second configuration information comprises a first time domain offset and position information of the grant-free PDSCH in transmission of grant-free PDSCHs, and the second configuration information is carried in second radio resource control (RRC) signaling; and
   determining time domain information of the first time unit and time domain information of the M candidate receiving positions based on the second configuration information.

7. An apparatus comprising:
   one or more processors; and
   a non-transitory computer readable medium storing a program, the program comprises instructions, which when executed by the one or more processors, causes the apparatus to:
   send indication information to a terminal device, wherein the indication information indicates the terminal device is to generate a semi-static codebook;
   determine whether to send a first physical downlink shared channel (PDSCH) to the terminal device at M candidate sending positions in a first time unit, wherein the first PDSCH is a semi-persistent scheduling (SPS) PDSCH or a grant-free PDSCH, and M is a positive integer; and determine, depending on whether the first PDSCH is sent to the terminal device at the M candidate sending positions, whether to receive first feedback information from the terminal device, wherein the first feedback information comprises acknowledgement (ACK) information or negative acknowledgement (NACK) information indicating whether the terminal device correctly decodes the first PDSCH detected at the M candidate sending positions;

wherein the apparatus to determine, depending on whether the first PDSCH is sent to the terminal device at the M candidate sending positions, whether to receive first feedback information from the terminal device comprises the apparatus to:

when the first PDSCH is sent to the terminal device at at least one of the M candidate sending positions in the first time unit, determining to receive the first feedback information from the terminal device; and the program further comprises instructions, which when executed by the one or more processors causes the apparatus to:
  determine a second time unit based on a first time domain offset and the first time unit,
  determine a fourth time unit set based on the second time unit and a time domain offset set, wherein the time domain offset set comprises the first time domain offset,
  determine whether a second PDSCH is sent to the terminal device in time units comprised in the fourth time unit set, wherein the second PDSCH is scheduled using a second physical downlink control channel (PDCCH), and a feedback time unit of ACK or NACK information indicating whether the terminal device correctly decodes the second PDSCH is the second time unit, and
  receive second feedback information from the terminal device in the second time unit, wherein the second feedback information comprises the ACK information or the NACK information indicating whether the first PDSCH is currently decoded.

8. The apparatus according to claim 7, wherein when the second PDSCH is not sent to the terminal device in the time units comprised in the fourth time unit set, the second feedback information comprises only the first feedback information.

9. The apparatus according to claim 7, wherein when one second PDSCH is sent to the terminal device in the time units comprised in the fourth time unit set, the second PDSCH is scheduled using fallback downlink control information (DCI) on the second PDCCH, and a downlink assignment index (DAI) in the DCI is 1 or 0, the second feedback information comprises only the first feedback information and third feedback information, and the third feedback information comprises the ACK information or the NACK information indicating whether the terminal device correctly decodes the detected second PDSCH.

10. The apparatus according to claim 7, wherein the apparatus to determine, depending on whether the first PDSCH is sent to the terminal device at the M candidate sending positions, whether to receive first feedback information from the terminal device comprises the apparatus to:

when the first PDSCH is sent to the terminal device at none of the M candidate sending positions in the first time unit, determine not to receive the first feedback information from the terminal device.

11. The apparatus according to claim 7, wherein when the first PDSCH is the grant-free PDSCH, the program further comprising instructions, which when executed by the one or more processors, cause the apparatus to send second configuration information to the terminal device, wherein the second configuration information comprises a first time domain offset and position information of the grant-free PDSCH in transmission of grant-free PDSCHs, and the second configuration information is carried in second radio resource control (RRC) signaling.

12. An apparatus comprising:
one or more processors; and
a non-transitory computer readable medium storing a program, the program comprises instructions, which when executed by the one or more processors, causes the apparatus to:
receive indication information from a network device, wherein the indication information indicates a semi-static codebook is to be generated;
detect a first physical downlink shared channel (PDSCH) at M candidate receiving positions in a first time unit, wherein the first PDSCH is a semi-persistent scheduling (SPS) PDSCH or a grant-free PDSCH, and M is a positive integer; and
determine, based on a detection result of the first PDSCH, whether to send first feedback information to the network device, wherein the first feedback information comprises acknowledgement (ACK) information or negative acknowledgement (NACK) information indicating whether the first PDSCH detected at the M candidate receiving positions is correctly decoded;
wherein the apparatus to determine, based on the detection result of the first PDSCH, whether to send first feedback information to the network device comprises:
when the first PDSCH is detected at at least one of the M candidate receiving positions, determine to send the first feedback information to the network device; and
the program further comprising instructions causing the apparatus to:
determine a second time unit based on a first time domain offset and the first time unit;
determine a fourth time unit set based on the second time unit and a time domain offset set, wherein the time domain offset set comprises the first time domain offset;
detect a second PDSCH in time units comprised in the fourth time unit set, wherein the second PDSCH is scheduled using a second physical downlink control channel (PDCCH), and a feedback time unit of ACK or NACK information indicating whether the second PDSCH is correctly decoded is the second time unit;
determine, based on a detection result of the second PDSCH, second feedback information sent in the second time unit, wherein the second feedback information comprises the ACK information or the NACK information indicating whether the first PDSCH is correctly decoded; and
send the second feedback information to the network device in the second time unit.

13. The apparatus according to claim 12, wherein when the second PDSCH is not detected in the time units comprised in the fourth time unit set, the second feedback information comprises only the first feedback information.

14. The apparatus according to claim 12, wherein when only one second PDSCH is detected in the time units comprised in the fourth time unit set, the second PDSCH is scheduled using fallback downlink control information (DCI) on the second PDCCH, and a downlink assignment index (DAI) in the DCI is 1 or 0, the second feedback information comprises only the first feedback information and third feedback information, and the third feedback information comprises ACK information or NACK information indicating whether the detected second PDSCH is correctly decoded.

15. The apparatus according to claim 12, wherein the apparatus to determine, based on the detection result of the first PDSCH, whether to send first feedback information to the network device comprises the apparatus to:
when the first PDSCH is detected at none of the M candidate receiving positions, determine not to send the first feedback information to the network device.

16. The apparatus according to claim 12, wherein when the first PDSCH is the SPS PDSCH, the program further comprises instructions, which when executed by the one or more processors, causes the apparatus to:
receive a first PDCCH from the network device, wherein the first PDCCH is used to activate transmission of SPS PDSCHs, a first time domain offset is indicated by the first PDCCH, and the first PDCCH further indicates position information of the first SPS PDSCH in the transmission of the SPS PDSCHs.

17. The apparatus according to claim 12, wherein when the first PDSCH is the grant-free PDSCH, the program further comprises instructions, which when executed by the one or more processors, causes the apparatus to:
receive second configuration information from the network device, wherein the second configuration information comprises a first time domain offset and position information of the grant-free PDSCH in transmission of grant-free PDSCHs, and the second configuration information is carried in second radio resource control (RRC) signaling; and
determine time domain information of the first time unit and time domain information of the M candidate receiving positions based on the second configuration information.

* * * * *

UNITED STATES PATENT AND TRADEMARK OFFICE
CERTIFICATE OF CORRECTION

PATENT NO. : 11,646,771 B2
APPLICATION NO. : 17/168722
DATED : May 9, 2023
INVENTOR(S) : Shengyu Li, Lei Guan and Ruixiang Ma It is certified that error appears in the above-identified patent and that said Letters Patent is hereby corrected as shown below:

In the Claims

In Claim 7, Column 35, Line 44, delete "currently decoded" and insert --correctly decoded--.

Signed and Sealed this
Eighth Day of August, 2023

Katherine Kelly Vidal
*Director of the United States Patent and Trademark Office*